US012242224B2

(12) United States Patent
Fukasawa et al.

(10) Patent No.: US 12,242,224 B2
(45) Date of Patent: Mar. 4, 2025

(54) CARTRIDGE INCLUDING A MEMORY MOUNTING PORTION AND IMAGE FORMING APPARATUS INCLUDING THE CARTRIDGE

(71) Applicant: CANON KABUSHIKI KAISHA, Tokyo (JP)

(72) Inventors: Yu Fukasawa, Tokyo (JP); Yukio Kubo, Tokyo (JP); Yosuke Kashiide, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/498,120

(22) Filed: Oct. 31, 2023

(65) Prior Publication Data

US 2024/0061373 A1 Feb. 22, 2024

Related U.S. Application Data

(63) Continuation of application No. 18/152,321, filed on Jan. 10, 2023, now Pat. No. 11,841,675, which is a (Continued)

(30) Foreign Application Priority Data

Aug. 28, 2020 (JP) ................................. 2020-144891

(51) Int. Cl.
*G03G 21/00* (2006.01)
*G03G 15/08* (2006.01)
*G03G 21/18* (2006.01)

(52) U.S. Cl.
CPC ..... *G03G 21/1885* (2013.01); *G03G 15/0863* (2013.01); *G03G 21/1878* (2013.01); *G03G 2221/1823* (2013.01)

(58) Field of Classification Search
CPC ........... G03G 15/0863; G03G 21/1652; G03G 21/1875; G03G 21/1878; G03G 21/1885;
(Continued)

(56) References Cited

U.S. PATENT DOCUMENTS 6,588,871 B2 7/2003 Studholme
6,654,567 B2 11/2003 Karakama
(Continued)

FOREIGN PATENT DOCUMENTS

CN 1459673 A 12/2003
CN 202033591 U 11/2011
(Continued)

OTHER PUBLICATIONS

Extended European Search Report issued in European Appln. No. 21192983.1 mailed on Dec. 13, 2021.
(Continued)

*Primary Examiner* — Robert B Beatty
(74) *Attorney, Agent, or Firm* — ROSSI, KIMMS & McDOWELL LLP

(57) ABSTRACT

Disclosed is a cartridge attachable to an image forming apparatus body, the cartridge including: a memory member storing information relating to the cartridge; and a supporting body having a memory mounting portion on which the memory member is mounted, the memory member having a first surface, a second surface, and a lateral surface, the first surface is provided with a contact portion connected to a body electrode portion of the body of the image forming apparatus when the cartridge is installed in the body of the image forming apparatus, the memory mounting portion has a first opposing portion opposing the second surface and a second opposing portion opposing the lateral surface when the memory member is mounted, the memory member is mounted by adhesive between the second surface and the
(Continued)

X-X first opposing portion and between the lateral surface and the second opposing portion.

13 Claims, 19 Drawing Sheets

Related U.S. Application Data continuation of application No. 17/408,753, filed on Aug. 23, 2021, now Pat. No. 11,579,565.

(58) Field of Classification Search
CPC .............. G03G 2215/0695; G03G 2215/0697; G03G 2221/1823; B41J 2/17546
USPC ................................................ 399/12, 25, 31
See application file for complete search history.

(56) References Cited

U.S. PATENT DOCUMENTS

| | | | |
|---|---|---|---|
| 7,837,120 | B1 | 11/2010 | Jang |
| 9,329,569 | B2 | 5/2016 | Tani |
| 2003/0049036 | A1 | 3/2003 | Ueno |
| 2003/0147667 | A1 | 8/2003 | Arimitsu |
| 2004/0120724 | A1 | 6/2004 | Takiguchi |
| 2005/0019061 | A1 | 1/2005 | Karakama et al. |
| 2008/0003014 | A1 | 1/2008 | Martin |
| 2020/0174423 | A1 | 6/2020 | Ogawa |
| 2021/0389722 | A1 | 12/2021 | Suzuki |
| 2022/0004144 | A1 | 1/2022 | Sakai |

FOREIGN PATENT DOCUMENTS

| | | | |
|---|---|---|---|
| CN | 207780487 | U | 8/2018 |
| CN | 110720079 | A | 1/2020 |
| CN | 111258198 | A | 6/2020 |
| JP | 2002072784 | A | 3/2002 |
| JP | 2014102506 | A | 6/2014 |
| JP | 2018109732 | A | 7/2018 |

OTHER PUBLICATIONS

Office Action issued in U.S. Appl. No. 17/408,753 mailed May 11, 2022.
Notice of Allowance issued in U.S. Appl. No. 17/408,753 mailed Oct. 13, 2022.
Office Action issued in U.S. Appl. No. 18/152,321 mailed May 25, 2023.
Notice of Allowance issued in U.S. Appl. No. 18/152,321 mailed Sep. 18, 2023.
Communication pursuant to Article 94(3) EPC issued in European Appln No. 21192983.1, mailed Feb. 15, 2024.
Office Action issued in Chinese Appln. No. 202110978774.1 mailed Sep. 23, 2024. English translation provided.

X-X

K-K

K-K

CARTRIDGE INCLUDING A MEMORY MOUNTING PORTION AND IMAGE FORMING APPARATUS INCLUDING THE CARTRIDGE

BACKGROUND OF THE INVENTION

Field of the Invention

The present invention relates to a cartridge and an image forming apparatus.

Description of the Related Art

Conventionally, image forming apparatuses that form images on sheet-shaped recording media such as papers according to an electrophotographic system or the like have been known. Examples of the image forming apparatuses include copiers, facsimile machines, printers (such as laser beam printers and LED printers), and their multi-function machines (multi-function printers).

Among such image forming apparatuses, image forming apparatuses of a cartridge type have been known. A cartridge is a unit detachably attachable to an image forming apparatus and is, for example, a process cartridge. The process cartridge includes a photosensitive member, process means (such as a charging member, a developing member, and a cleaning member) acting on the photosensitive member, or the like. By the use of the cartridge, a developer replenishing operation for the image forming apparatus or the maintenance of various process means is facilitated. That is, the photosensitive member, the charging member, the developing member, the cleaning member, and the like are collectively made into a cartridge inside a frame body, and the cartridge is made detachably attachable to the main body of the image forming apparatus. Thus, since a user himself/herself is allowed to conduct the maintenance of the apparatus through the replacement of the cartridge, operability is improved.

Some cartridges have a memory such as IC memory mounted thereon and enable the transmission and reception of information between the main body of an apparatus and the cartridges when the cartridges are mounted on the main body of the apparatus. Examples of information stored in the memory mounted on the cartridges include the lot numbers of the cartridges, the characteristics of the image forming apparatus, and the characteristics of process means. Thus, the maintenance of the main body of the apparatus or the cartridges is facilitated. In addition, the control of image formation according to information stored in the memory makes it possible to perform the image formation under optimum conditions.

Japanese Patent Application Laid-open No. 2014-102506 discloses a method for fixing a memory to the frame body or the component of a cartridge by adhesive or the like in an image forming apparatus using the cartridge on which such a memory is mounted.

SUMMARY OF THE INVENTION

There has been demanded a method for more reliably preventing a memory from falling off when the memory is provided in the cartridge of an image forming apparatus.

The present invention has been made in view of the above problem and has an object of providing a technology for preventing a memory provided in a cartridge installed in an image forming apparatus from falling off.

The present invention provides a cartridge detachably attachable to a main body of an image forming apparatus, the cartridge comprising:

a memory member that stores information relating to the cartridge; and a supporting body that has a memory mounting portion on which the memory member is mounted, wherein the memory member has a first surface, a second surface on a side opposite to the first surface, and a lateral surface extending in a direction crossing the first surface and the second surface, the first surface is provided with a contact portion that is connected to a main-body electrode portion of the main body of the image forming apparatus in a case where the cartridge is installed in the main body of the image forming apparatus, the memory mounting portion has a first opposing portion that is a surface opposing the second surface and a second opposing portion that opposes the lateral surface in a case where the memory member is mounted, and the memory member is mounted on the memory mounting portion by arrangement of adhesive between the second surface and the first opposing portion and between the lateral surface and the second opposing portion.

According to the present invention, it is possible to provide a technology for preventing a memory provided in a cartridge installed in an image forming apparatus from falling off.

Further features of the present invention will become apparent from the following description of exemplary embodiments with reference to the attached drawings.

DESCRIPTION OF THE EMBODIMENTS

Hereinafter, modes for carrying out the present invention will be exemplarily described in detail with reference to the drawings and embodiments. However, the functions, materials, dimensions, shapes, their relative arrangements, or the like of constituting components described in the embodiments will not intend to limit the scope of the present invention unless otherwise specifically noted. Further, the functions, materials, dimensions, shapes, their relative arrangements, or the like of members once described in the following description will be the same as those initially described unless otherwise particularly noted.

In the following description, a laser beam printer will be exemplified as an electrophotographic image forming apparatus, and a process cartridge used in the laser beam printer will be exemplified as a cartridge. The present invention may be grasped as an invention relating to a cartridge on which a memory member is mountable, or may be an invention relating to an image forming apparatus including the cartridge and the main body of an image forming apparatus. Further, the present invention may be grasped as a method for manufacturing the cartridge or a method for manufacturing the image forming apparatus, the method including a step of mounting a memory member on the cartridge.

Note that in the following description, the longitudinal direction of the cartridge will be the rotational axis direction of an electrophotographic photosensitive drum and will be a direction substantially orthogonal to a direction in which the cartridge is attached to and detached from the main body of the image forming apparatus. Further, in the longitudinal direction, a side on which the photosensitive drum receives a driving force from the main body of the image forming apparatus is defined as a driving side, and the side opposite to the driving side is defined as a non-driving side. The “front side” of the image forming apparatus is defined as a direction in which the driving side is positioned on the right and the non-driving side is positioned on the left when the main body of the image forming apparatus is seen from the front side.

First Embodiment

Figure 2:
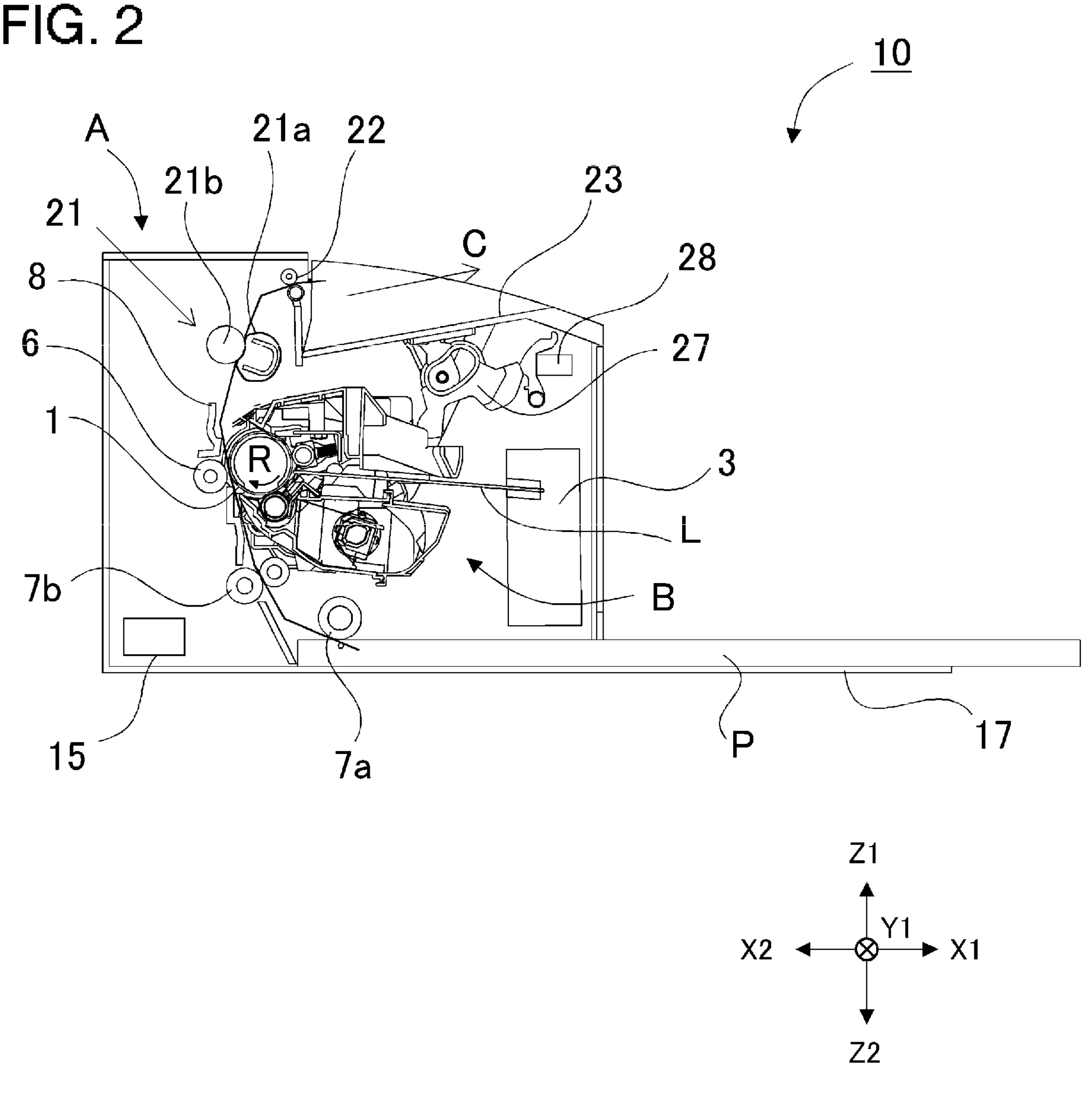
FIG. 2 is a schematic cross-sectional view of an image forming apparatus.
Figure 3:
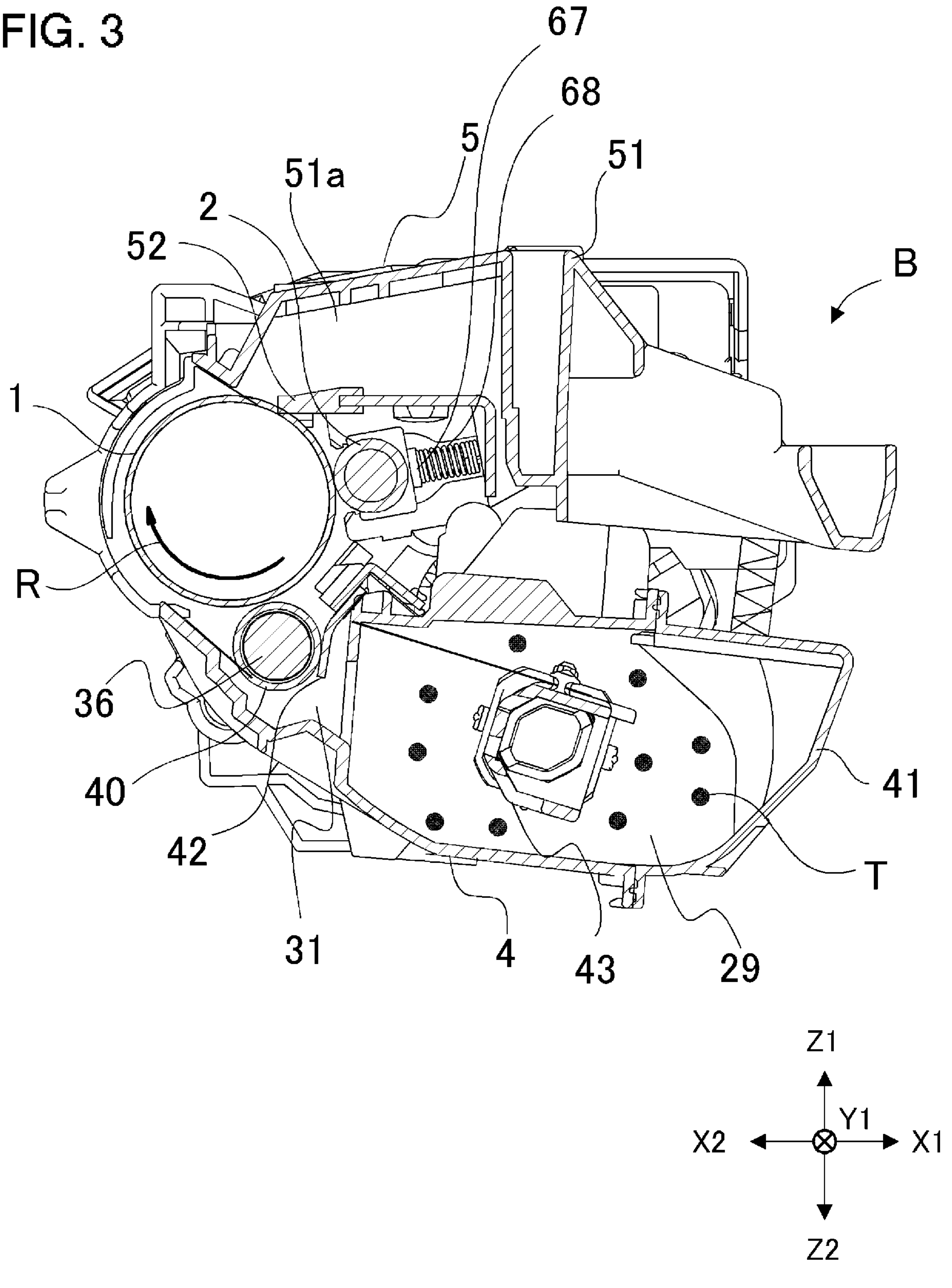
FIG. 3 is a schematic cross-sectional view of a cartridge.

First, the entire configuration and image forming process of a first embodiment will be described. FIG. 2 is a cross-sectional view of an apparatus main body A and a process cartridge (hereinafter described as a cartridge B) of an electrophotographic image forming apparatus 10. FIG. 3 is a cross-sectional view of the cartridge B. Here, the apparatus main body A is a portion excluding the cartridge B from the image forming apparatus.

Entire Configuration

The image forming apparatus 10 shown in FIG. 2 is a laser beam printer in which the cartridge B is detachably attachable to the apparatus main body A. The apparatus main body A has an exposure apparatus 3 (laser scanner unit) used to form a latent image on a photosensitive drum 1 provided in the cartridge B when the cartridge B is mounted. Further, a sheet tray 17 in which sheet materials P that are recording media on which an image is to be formed are accommodated is arranged under the cartridge B in the paper.

According to the control of a control unit 15, the image forming apparatus 10 performs an image forming process on the sheet materials P on the basis of image information acquired by reception or the like from the outside of the apparatus.

In the apparatus main body A, a pickup roller 7*a*, a pair of feeding rollers 7*b*, a transfer roller 6, a transport guide 8, a fixing apparatus 21, a discharge roller 22, a discharge tray 23, and the like are also sequentially arranged along the transporting direction of the sheet materials P. The fixing apparatus 21 is constituted by a heat roller 21*a* and a pressurization roller 21*b*. The apparatus main body A further includes cartridge pressure members 27 and cartridge pressure springs 28 that will be described later.

The cartridge B has the photosensitive drum 1 serving as an image bearing member, a charging roller 2 serving as a charging member, a developing unit 4 serving as a developing apparatus, and a cleaning unit 5 serving as cleaning means. The developing unit 4 has a developing roller 40 (developer bearing member) including a magnet roller 36, a developing container 41 in which toner T (developer) is accommodated and retained in a toner chamber 29, a transport member 43 serving also as a stirring member, and a developing blade 42. A cleaning unit 5 includes a cleaning frame body 51 including a waste toner chamber 51*a* or the like and a cleaning blade 52.

Image Forming Process

Next, the image forming process will be described. On the basis of the print start signal of the control unit 15, a drive coupling 26 (see FIG. 6B) of the apparatus main body A rotates. Since the drive coupling 26 engages the photosensitive drum 1 of the cartridge B, the photosensitive drum 1 also rotates at a prescribed peripheral speed (process speed) in an arrow R direction (see FIGS. 2 and 3) as the drive coupling 26 rotates. At this time, the charging roller 2 to which a bias voltage has been applied contacts the outer peripheral surface of the photosensitive drum 1 to uniformly charge the outer peripheral surface of the photosensitive drum 1 as shown in FIG. 3.

The exposure apparatus 3 of the apparatus main body A outputs laser light L according to image information with the control of the control unit 15. When the laser light L performs scanning exposure on the outer peripheral surface of the photosensitive drum 1, an electrostatic latent image corresponding to the image information is formed on the outer peripheral surface of the photosensitive drum 1.

On the other hand, toner T accommodated in the toner chamber 29 of the developing unit 4 is stirred and transported by the rotation of the transport member 43 and delivered to a toner supply chamber 31. The toner T of the toner supply chamber 31 is born on the surface of the developing roller 40 by the magnetic force of the magnet roller 36 (stationary magnet). The developing blade 42 controls a layer thickness on the peripheral surface of the developing roller 40, while friction-charging the toner T born on the developing roller 40. Then, the toner T supplied to the photosensitive drum 1 develops an electrostatic latent image to be visualized as a toner image.

Further, in conjunction with the output timing of the laser light L, the pickup roller 7*a* and the pair of feeding rollers

7*b* transport a sheet material P accommodated in the sheet tray 17 at the lower portion of the apparatus main body A to the transfer position between the photosensitive drum 1 and the transfer roller 6. A toner image on the photosensitive drum 1 is transferred onto the sheet material P at the transfer position. The sheet material P onto which the toner image has been transferred is separated from the photosensitive drum 1 and transported to the fixing apparatus 21 along the transport guide 8. The fixing apparatus 21 performs pressurization/heat fixation processing on the sheet material P passing through the nip portion between the heat roller 21*a* and the pressurization roller 21*b* to fix the toner image onto the sheet material P. Subsequently, the sheet material P is transported to the discharge roller 22 and discharged to the discharge tray 23.

On the other hand, the cleaning blade 52 removes residual toner on the outer peripheral surface of the photosensitive drum 1 from which the toner image has been transferred and stores the removed residual toner in the waste toner chamber 51*a* as shown in FIG. 3. After that, the photosensitive drum 1 is used in an image forming process again. In the above process, the charging roller 2, the developing roller 40, the transfer roller 6, and the cleaning blade 52 can be regarded as process means that acts on the photosensitive drum 1.

Entire Configuration of Cartridge

Figure 4:
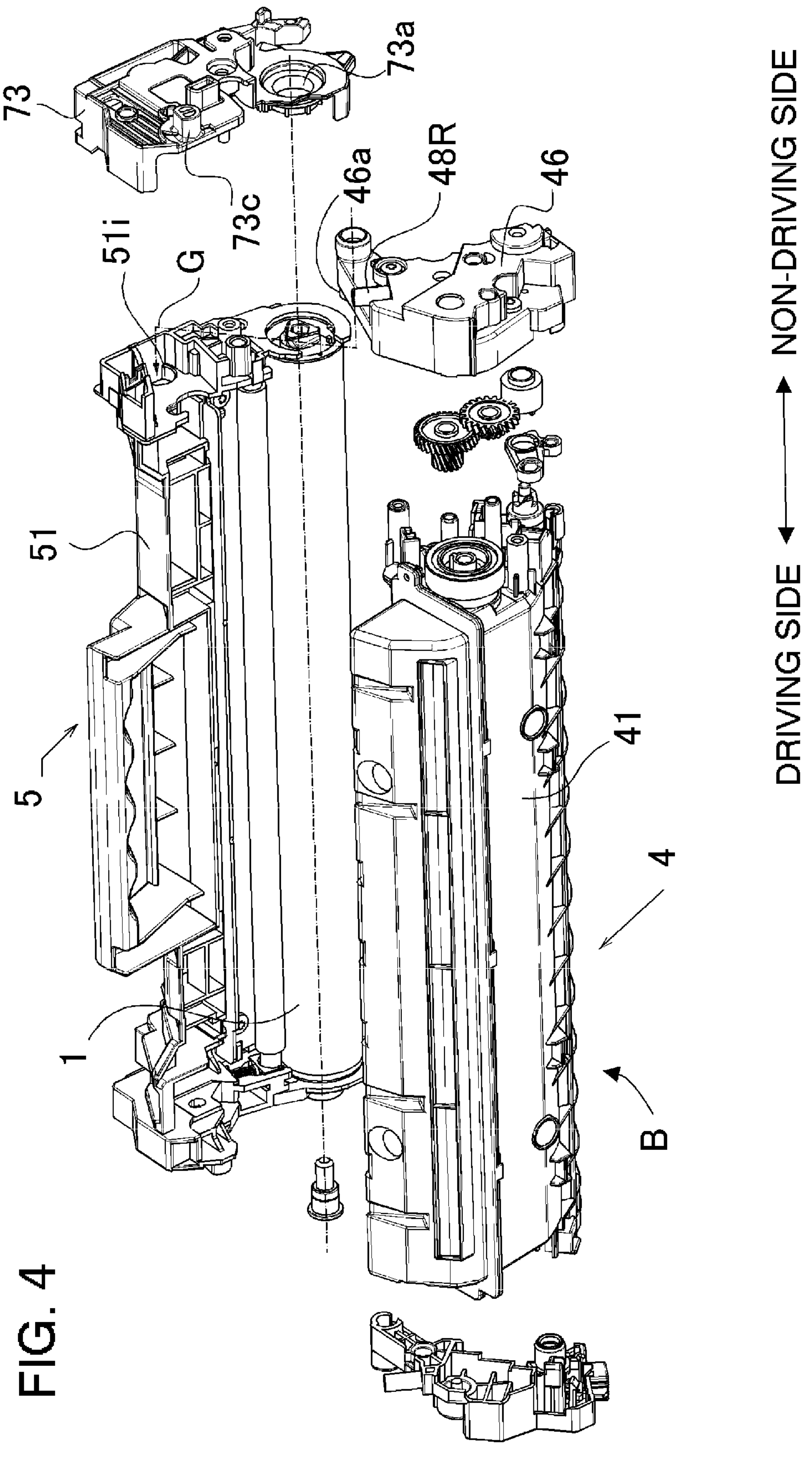
FIG. 4 is an exploded perspective view showing the driving side of the cartridge.
Figure 5:
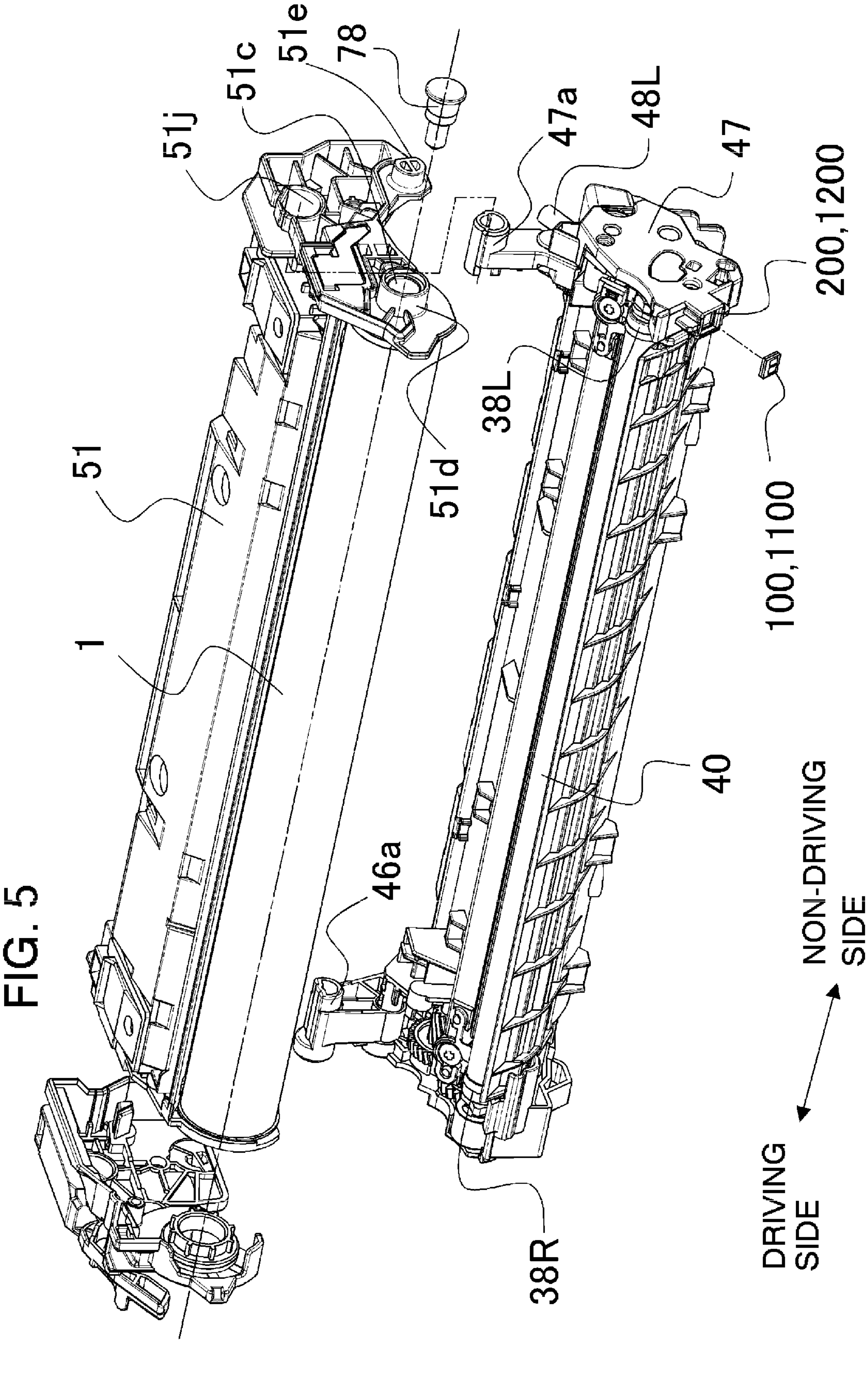
FIG. 5 is an exploded perspective view showing the non-driving side of the cartridge.

Next, the entire configuration of the cartridge B will be described. FIG. 3 is a cross-sectional view of the cartridge B, and FIGS. 4 and 5 are exploded perspective views for describing the configuration of the cartridge B. Note that screws used to connect respective components to each other will be omitted in the present embodiment.

In FIGS. 4 and 5, the cartridge B is discomposed into the cleaning unit 5 and the developing unit 4 to be shown. The cleaning unit 5 has the photosensitive drum 1, the charging roller 2, the cleaning blade 52, and a cleaning frame body 51 that supports the photosensitive drum 1, the charging roller 2, and the cleaning blade 52. On the driving side of the photosensitive drum 1, a drum shaft 78 is press-fitted into a hole portion 73*a* (see FIG. 4) of a drum bearing 73. Further, on the non-driving side of the photosensitive drum 1, the drum shaft 78 is press-fitted into a hole portion 51*c* (see FIG. 5) provided on the cleaning frame body 51. Thus, the photosensitive drum 1 is rotatably supported. Note that the drum bearing 73 and the cleaning frame body 51 may be collectively called a cleaning frame body in a broad sense.

As shown in FIG. 3, the charging roller 2 and the cleaning blade 52 are arranged so as to contact the outer peripheral surface of the photosensitive drum 1. The charging roller 2 is brought into press-contact with the photosensitive drum 1 in a state in which a charging roller bearing 67 is pressurized by an urging member 68 toward the photosensitive drum 1. The charging roller 2 is driven to rotate by the rotation of the photosensitive drum 1.

The developing unit 4 has the developing roller 40, the developing container 41 that supports the developing roller 40, the developing blade 42, and the like. The developing roller 40 is rotatably mounted on the developing container 41 by a driving-side developing bearing 46 (see FIG. 4) and a non-driving-side developing bearing 47 (see FIG. 5) that are provided at both ends. Further, the non-driving-side developing bearing 47 of the present embodiment serves as a supporting body on which a memory mounting portion 200 is provided. On the memory mounting portion 200, a memory tag 100 serving as a memory member is mounted.

Further, the magnet roller 36 is provided in the developing roller 40. In the developing unit 4, the developing blade 42 used to control a toner layer on the developing roller 40 is arranged. As shown in FIG. 5, interval retention members 38 (38R and 38L) are mounted at both ends of the developing roller 40. Since the interval retention members 38 contact the photosensitive drum 1, the developing roller 40 is retained with a slight gap produced between the developing roller 40 and the photosensitive drum 1.

A procedure for connecting the developing unit 4 and the cleaning unit 5 to each other to constitute the cartridge B will be described. First, the center of a developing first supporting boss 46*a* of the driving-side developing bearing 46 corresponding to a first hanging hole 51*i* on the driving side of the cleaning frame body 51 and the center of a developing second supporting boss 47*a* of the non-driving-side developing bearing 47 corresponding to a second hanging hole 51*j* on the non-driving side thereof are aligned with each other. Specifically, when the developing unit 4 is moved in an arrow G direction, the developing first supporting boss 46*a* and the developing second supporting boss 47*a* are fitted into the first hanging hole 51*i* and the second hanging hole 51*j*, respectively. Thus, the developing unit 4 is rotatably connected to the cleaning unit 5. As a result, the developing roller 40 is connected so as to be capable of contacting and separating from the photosensitive drum 1. After that, the drum bearing 73 is mounted on the cleaning unit 5 to constitute the cartridge B.

Developing urging members 48 (a non-driving-side developing urging member 48L and a driving-side developing urging member 48R) formed of compression springs urge the developing unit 4 to the cleaning unit 5 by an urging force. Thus, the interval retention members 38 provided at the developing roller 40 are brought into contact with the photosensitive drum 1.

Installation of Cartridge

Figure 6A:
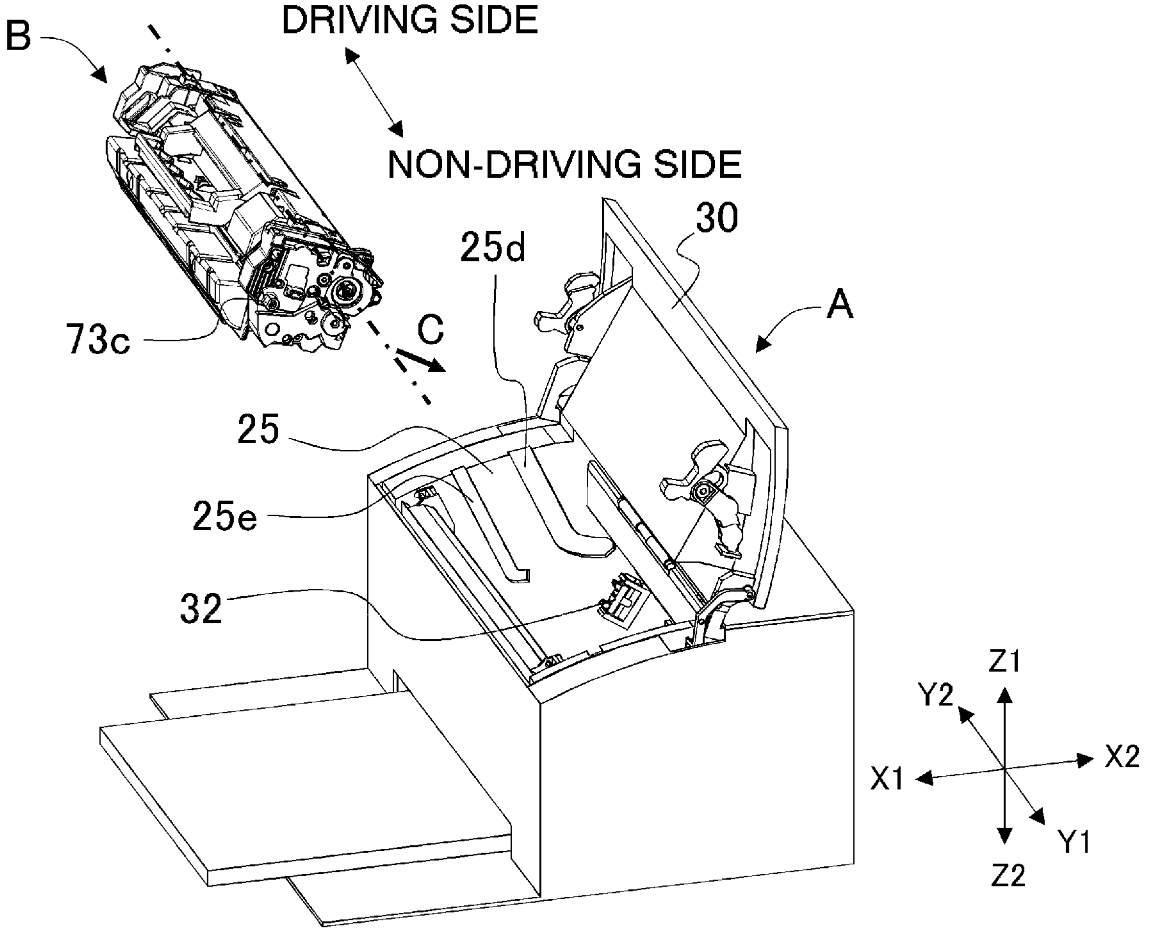
FIG. 6A is a view describing the installation of the cartridge.
Figure 6B:
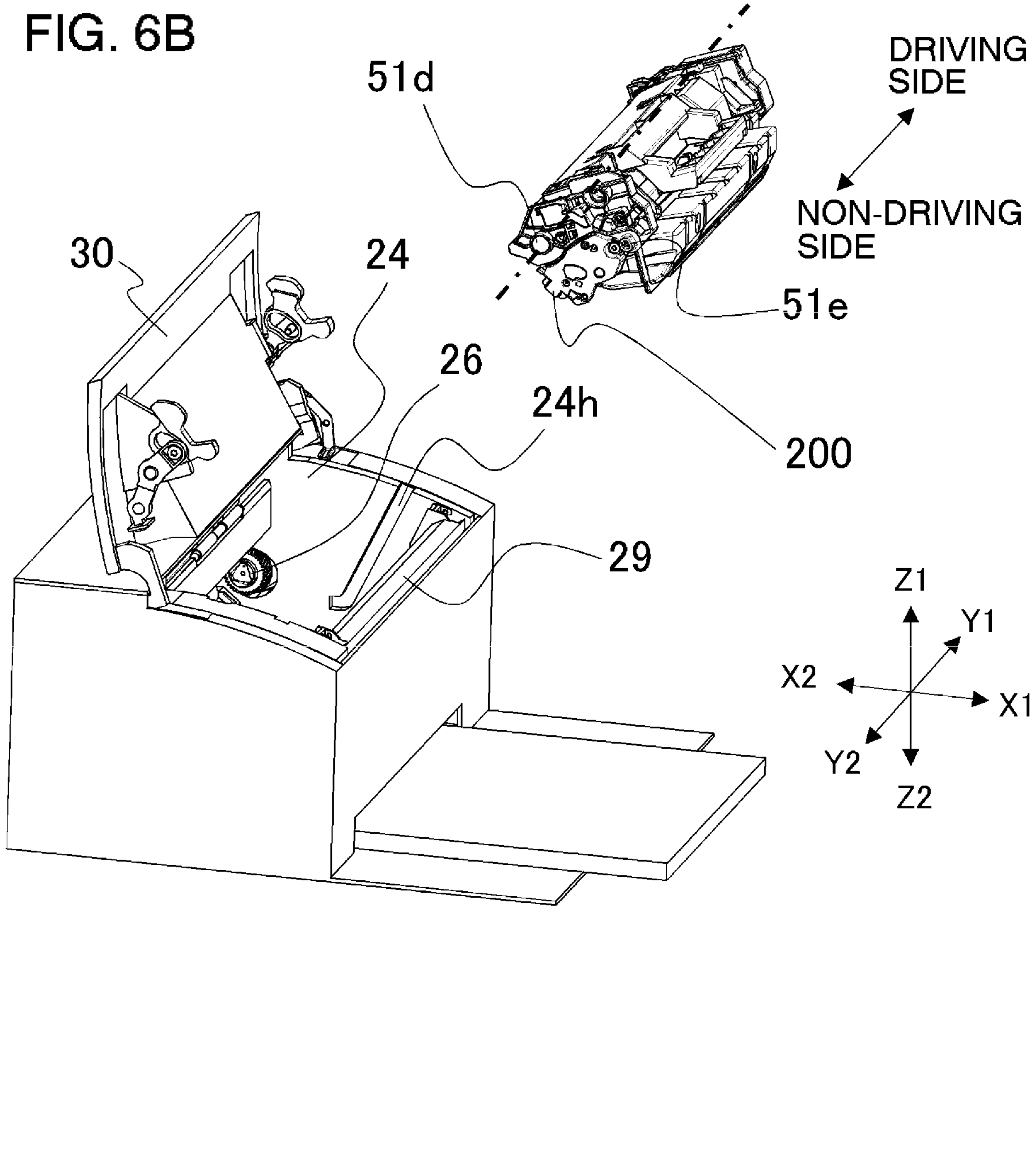
FIG. 6B is a view describing the installation of the cartridge.
Figure 7A:
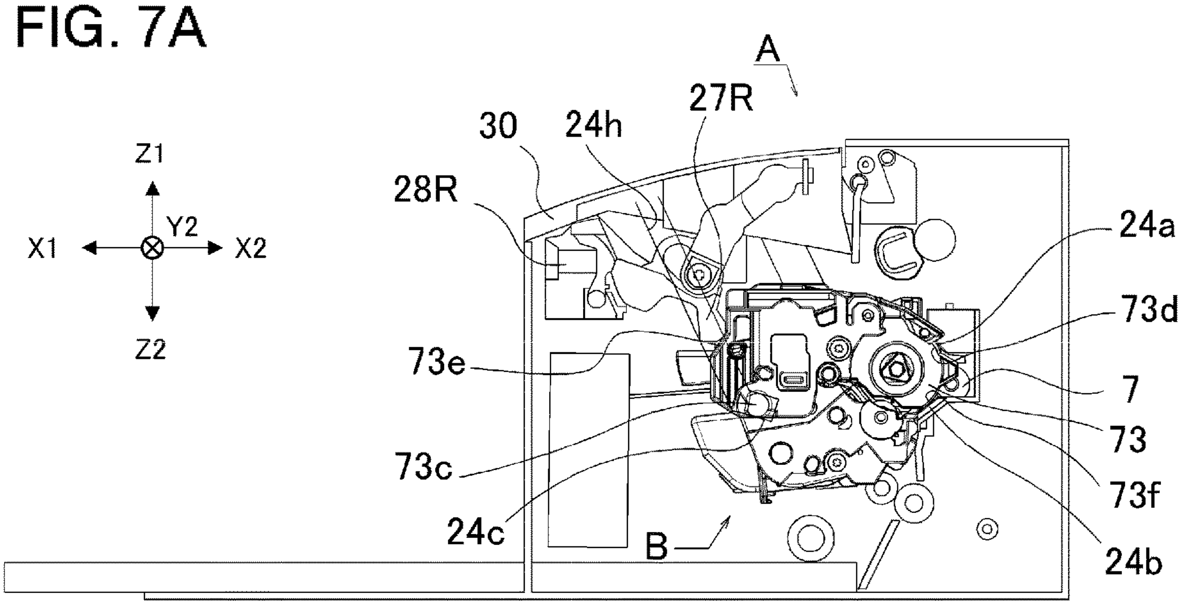
FIGS. 7A and 7B are cross-sectional views describing a cartridge installation process.
Figure 7B:
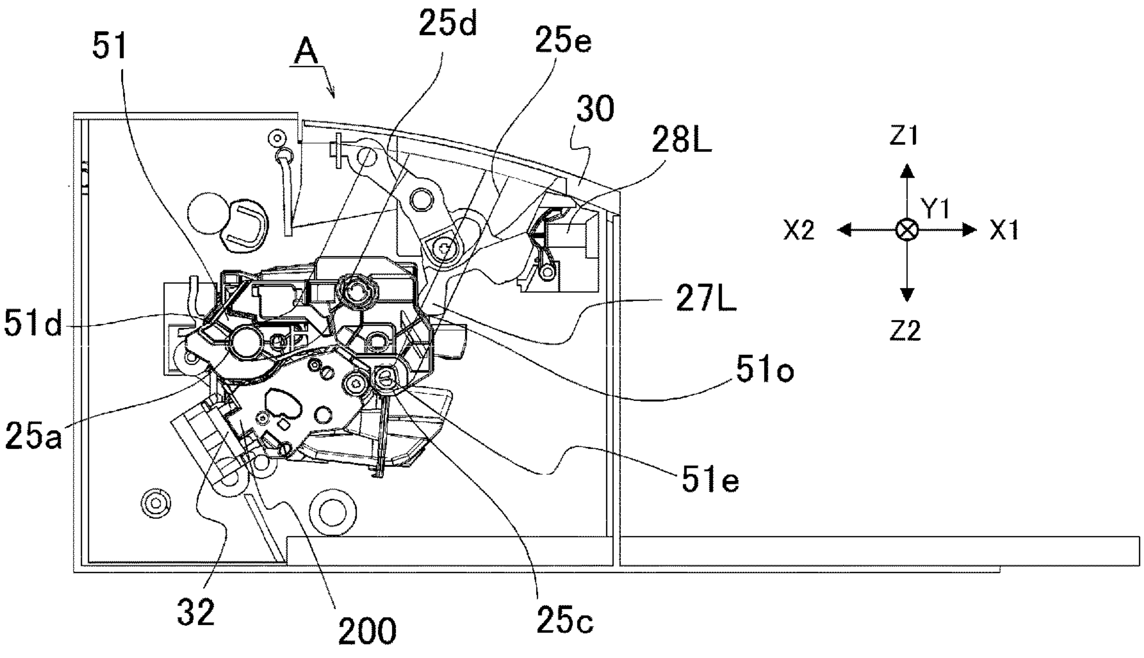

Next, the installation of the cartridge B will be described using FIGS. 6A, 6B, 7A, and 7B. FIG. 6A is a perspective view of the apparatus main body A during the installation of the cartridge B when seen from a driving-side guide portion. FIG. 6B is a perspective view of the apparatus main body A during the installation of the cartridge B when seen from a non-driving-side guide portion. FIG. 7A is a cross-sectional view of the apparatus main body A during the positioning of the cartridge B when seen from the driving side. FIG. 7B is a cross-sectional view of the apparatus main body A during the positioning of the cartridge B when seen from the non-driving side.

As shown in FIG. 6A, the installation direction of the cartridge B is a direction (as indicated by arrow C) substantially orthogonal to the axis line of the photosensitive drum 1. A driving-side plate 24 has a driving-side guide rail 24*h* serving as a guide (see FIG. 6B), and a non-driving-side plate 25 has a non-driving-side upper guide rail 25*d* and a non-driving-side lower guide rail 25*e* (see FIG. 6A).

Further, the drum bearing 73 provided on the driving side of the cartridge B is provided with a rotation stopped portion 73*c* (see FIGS. 4, 6A, and 7A). Further, the cleaning frame body 51 has a positioned portion 51*d* and a rotation stopped portion 51*e* on the non-driving side in its longitudinal direction (see FIGS. 5, 6B, and 7B).

The rotation stopped portion 73*c* on the driving side of the cartridge B inserted into the apparatus main body A is guided by the driving-side guide rail 24*h* of the apparatus main body A. At the same time, the positioned portion 51*d* and the rotation stopped portion 51*e* on the non-driving side of the cartridge B are guided by the non-driving-side upper guide rail 25*d* and the non-driving-side lower guide rail 25*e* of the apparatus main body A, respectively.

Next, a state in which an opening/closing door 30 is closed will be described. As shown in FIG. 7A, the driving-side plate 24 has an upper positioning portion 24*a*, a lower positioning portion 24*b*, and a rotation stopping portion 24*c* as a positioning mechanism. Further, the drum bearing 73 has an upper positioned portion 73*d* and a lower positioned portion 73*f*. In addition, as shown in FIG. 7B, the non-driving-side plate 25 has a non-driving-side positioning portion 25*a* and a non-driving-side rotation stopping portion 25*c*.

Further, the cartridge pressure members 27 (27R and 27L) are rotatably mounted at both ends in the axial direction of the opening/closing door 30. The cartridge pressure springs 28 (28R and 28L) are, respectively, mounted at both ends in the longitudinal direction of a front plate 29 provided in the apparatus main body A. The drum bearing 73 has a pressed portion 73*e* serving as an urging force receiving portion, and the cleaning frame body 51 has a pressed portion 510 on the non-driving side. When the opening/closing door 30 is closed, the pressed portions 73*e* and 510 of the cartridge B are pressed by the cartridge pressure members 27 (27R and 27L) urged by the cartridge pressure springs 28 (28R and 28L) of the apparatus main body A.

When the cartridge B receives a pressing force, the upper positioned portion 73*d*, the lower positioned portion 73*f*, and the rotation stopped portion 73*c* of the cartridge B are fixed to the upper positioning portion 24*a*, the lower positioning portion 24*b*, and the rotation stopping portion 24*c* of the apparatus main body A, respectively. Further, on the non-driving side, the positioned portion 51*d* and the rotation stopped portion 51*e* of the cartridge B are fixed to the non-driving-side positioning portion 25*a* and the non-driving-side rotation stopping portion 25*c* of the apparatus main body A, respectively. Thus, the cartridge B and the photosensitive drum 1 are positioned on both the driving side and the non-driving side.

Note that a configuration for positioning the cartridge B in the apparatus main body A is not limited to the above example. For example, the opening/closing door 30 may directly tuck the cartridge B or a user may tuck the cartridge B without using the cartridge pressure members 27. Further, the positions and the numbers of the positioning configurations on the side of the apparatus main body A and the positions and the numbers of the positioning configurations on the side of the cartridge B are not limited to the above example.

Tag Connector and Positioning of Memory Tag

Figure 8A:
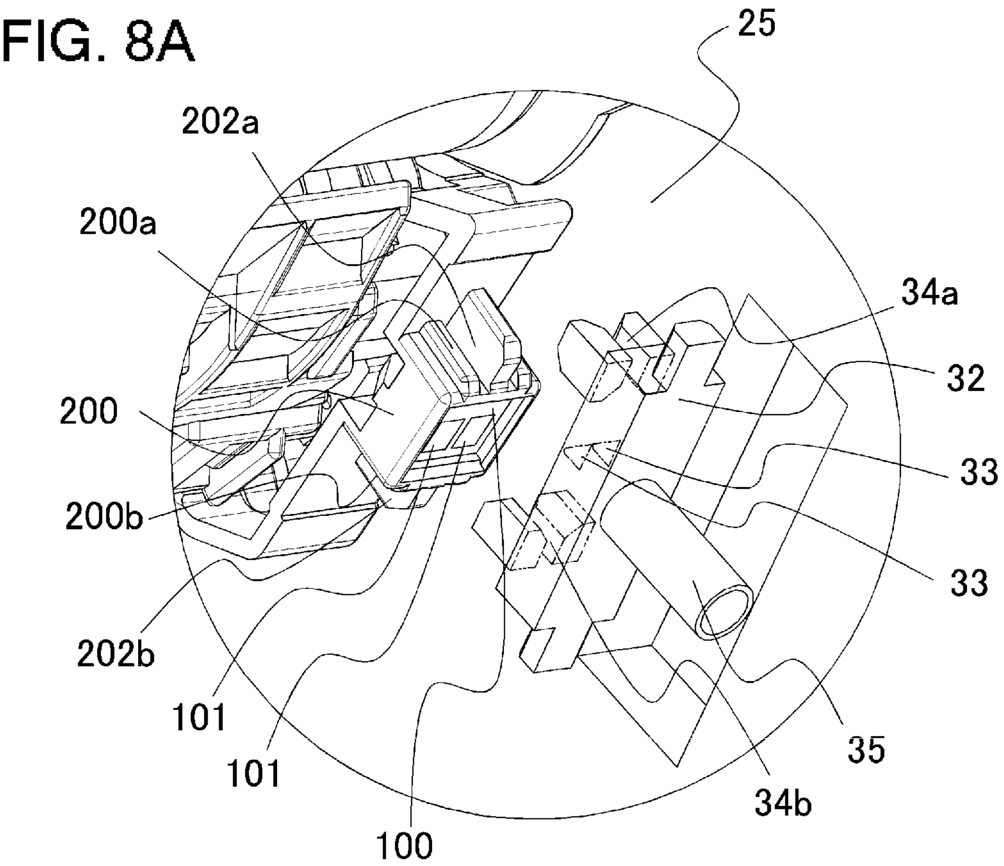
FIGS. 8A and 8B are views describing the contacts of a memory member.
Figure 8B:
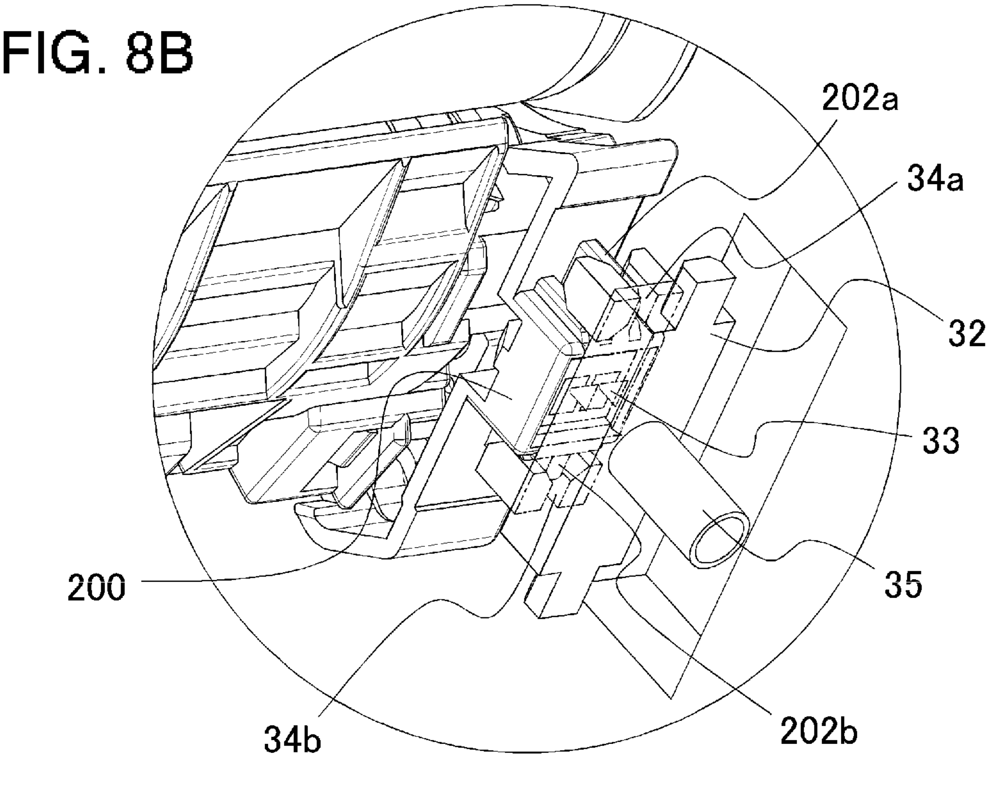

As shown in FIG. 6A, the non-driving-side plate 25 of the apparatus main body A is provided with a tag connector 32 including an electric contact electrically connectable to the memory tag 100 at a position corresponding to the memory mounting portion 200 of the cartridge B. FIGS. 8A and 8B are enlarged perspective views showing the positioning configuration of the memory tag 100 provided in the cartridge B and the tag connector 32 provided in the apparatus main body A. The tag connector 32 is supported by the non-driving-side plate 25 and pressed in the direction of the cartridge B from the non-driving-side plate 25 by a connector spring 35. Further, the tag connector 32 is provided with main-body electrode portions 33 capable of contacting contact portions 101 provided in the memory tag 100. The tag connector 32 is further provided with contact positioning portions 34 (34*a* and 34*b*) formed on both sides across the main-body electrode portions 33.

Meanwhile, the non-driving-side developing bearing 47 of the cartridge B is provided with the memory mounting portion 200 for mounting the memory tag 100. In the memory mounting portion 200, positioning ribs 202*a* and 202*b* and lateral wall portions 200*a* and 200*b* are provided at positions opposing the contact positioning portions 34*a* and 34*b* of the tag connector 32 when the cartridge B is installed.

As the cartridge B is inserted into the apparatus main body A, the lateral wall portions 200*a* and 200*b* and the positioning ribs 202*a* and 202*b* engage the opposing contact positioning portions 34*a* and 34*b*, respectively. When the memory mounting portion 200 is positioned with respect to the tag connector 32 in the manner described above, the cartridge B is positioned in the apparatus main body A. As a result, the contact portions 101 of the memory tag 100 contact the main-body electrode portions 33 of the tag connector 32 to establish electrical connection. Thus, the transmission and reception of information between the cartridge B and the apparatus main body A is made possible.

Configurations of Memory Tag and Memory Mounting Portion

Figure 1A:
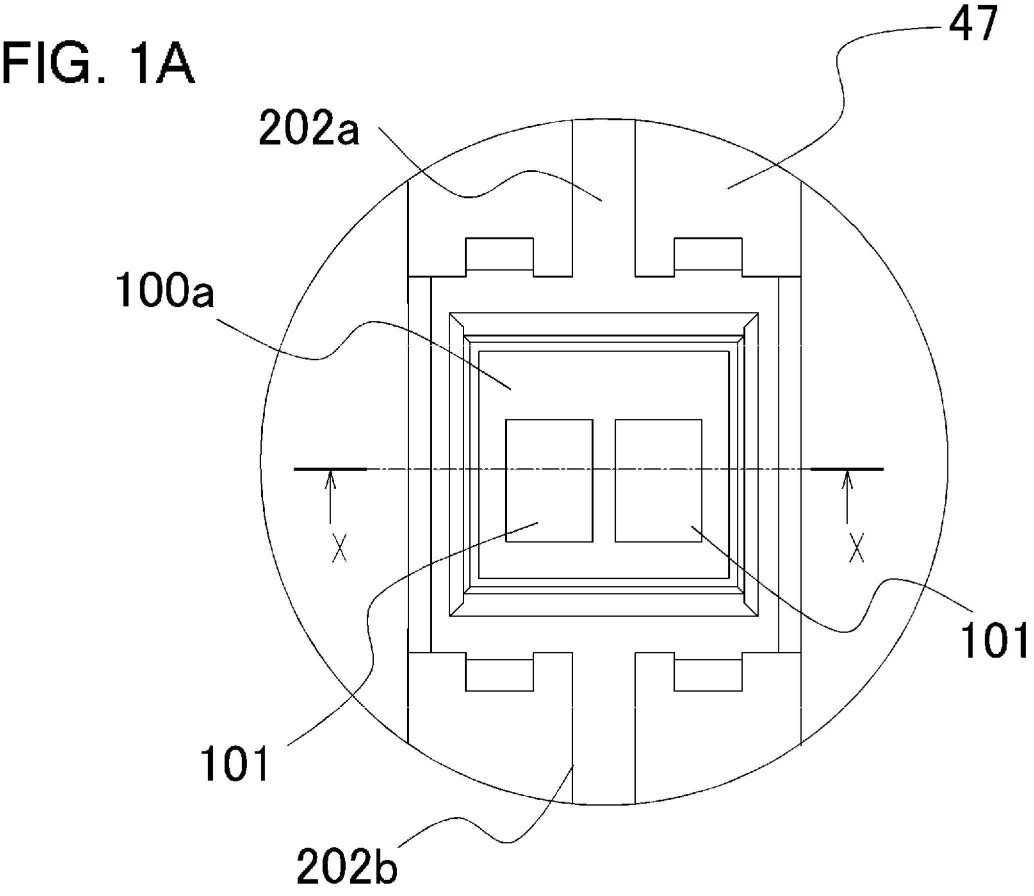
FIGS. 1A and 1B are cross-sectional views of a memory mounting portion in which a memory member is accommodated.
Figure 1B:
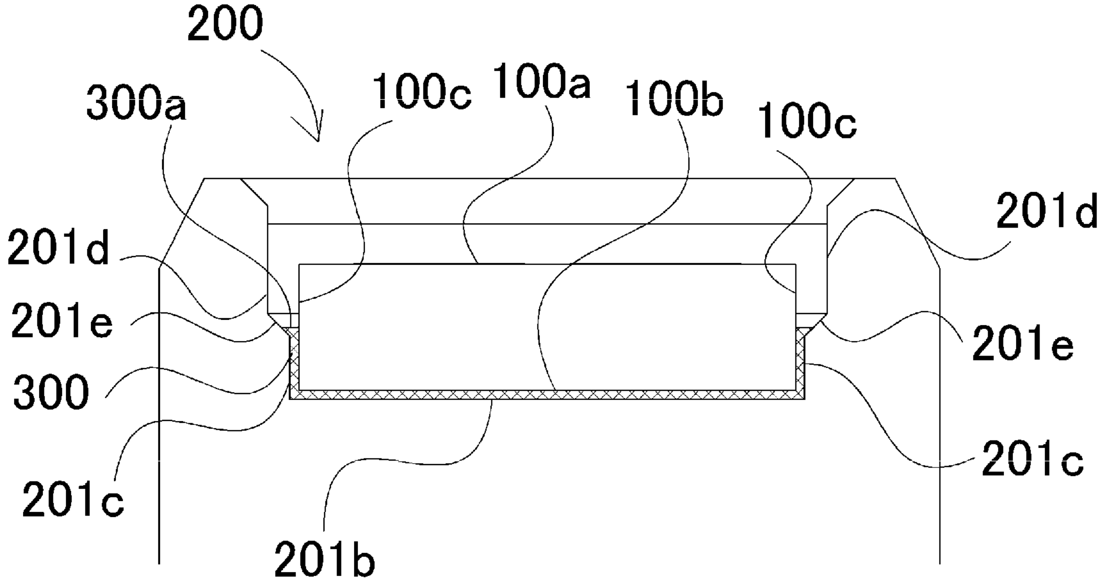
Figure 9:
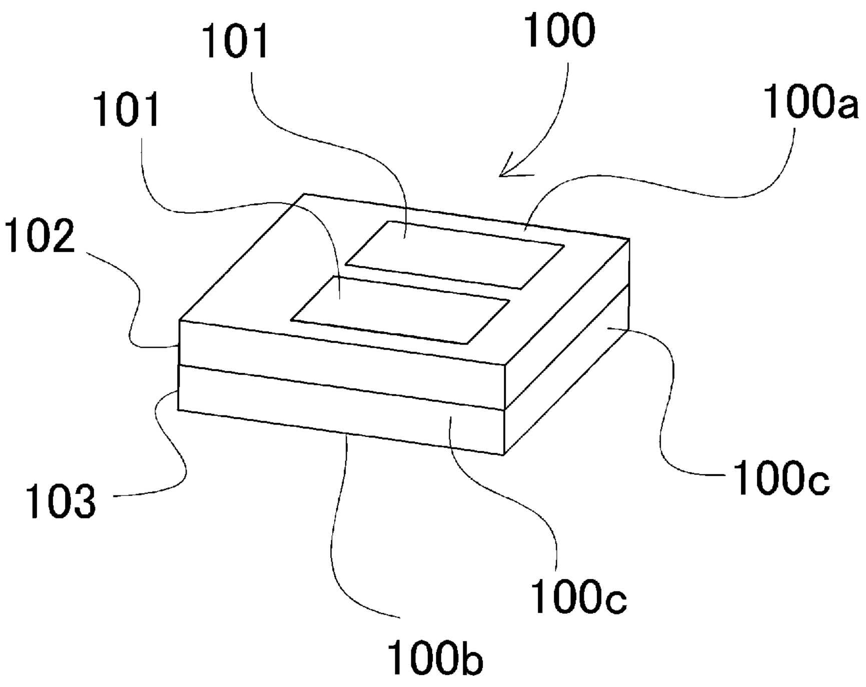
FIG. 9 is a perspective view of the memory member.
Figure 10:
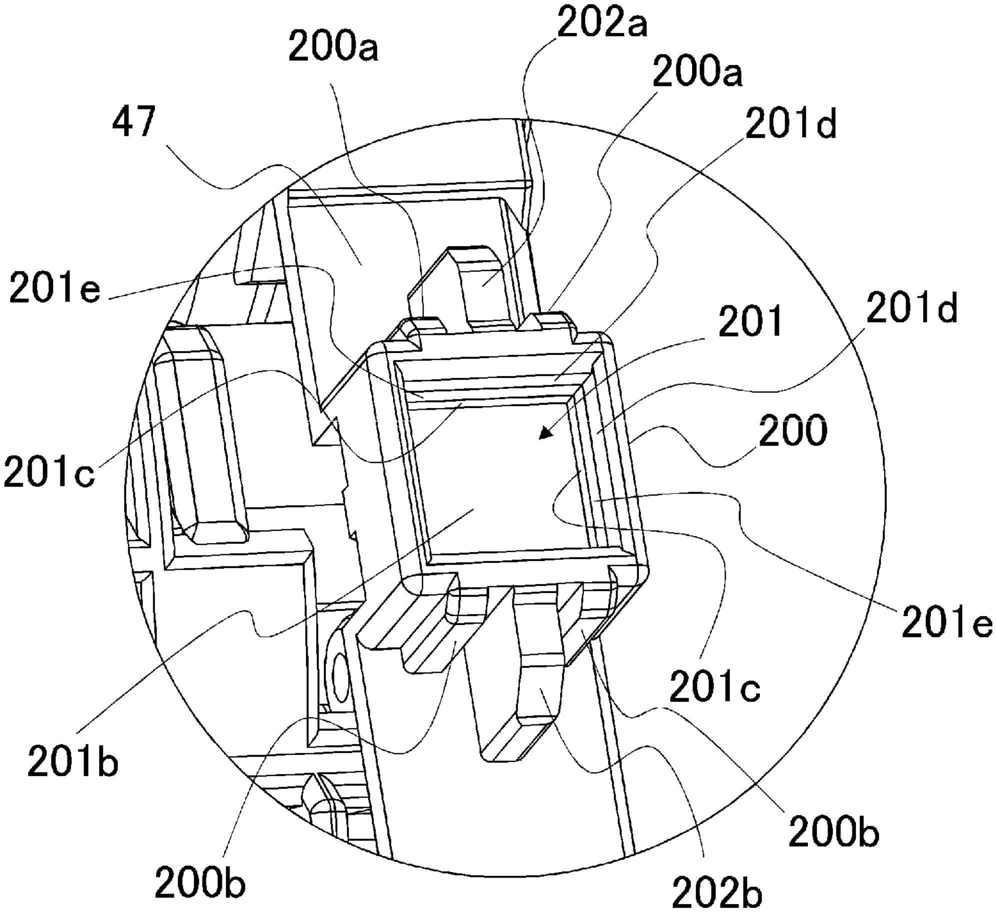
FIG. 10 is a perspective view of the memory mounting portion.
Figure 11A:
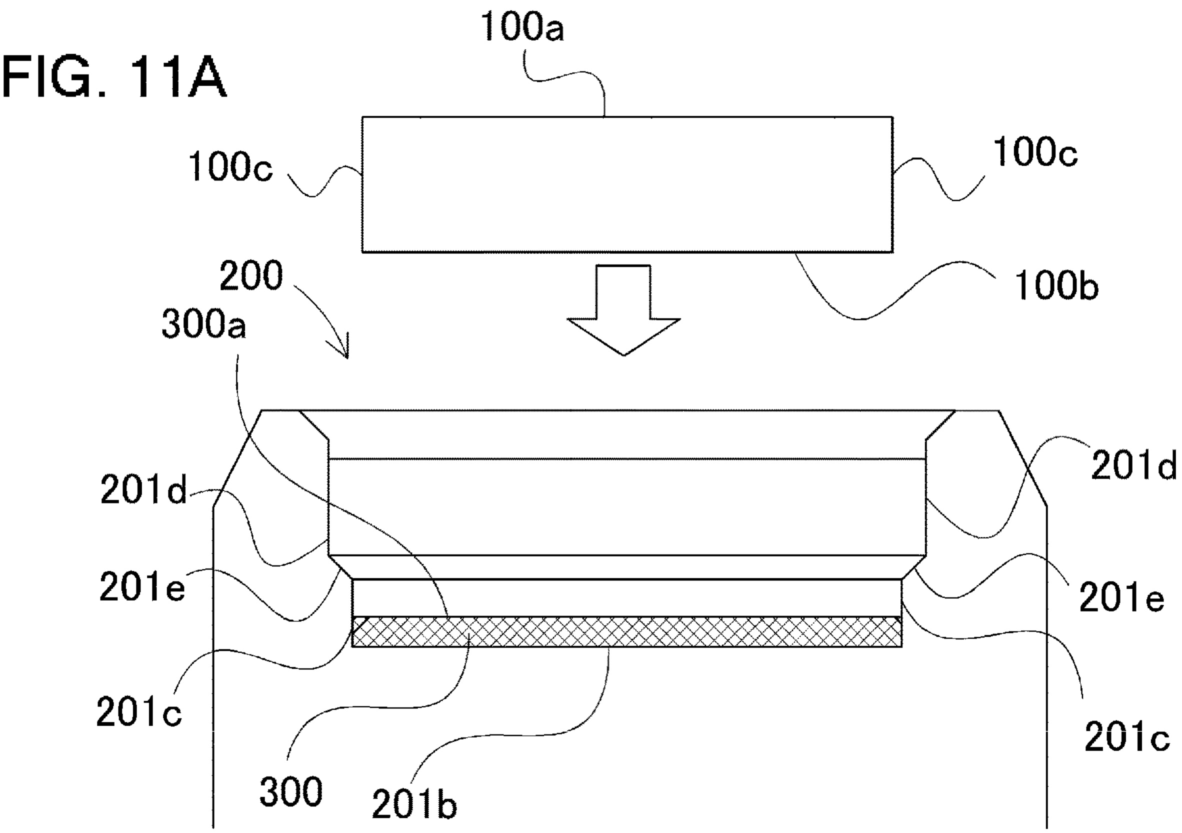
FIGS. 11A and 11B are cross-sectional views describing the mounting of the memory member on the memory mounting portion.
Figure 11B:
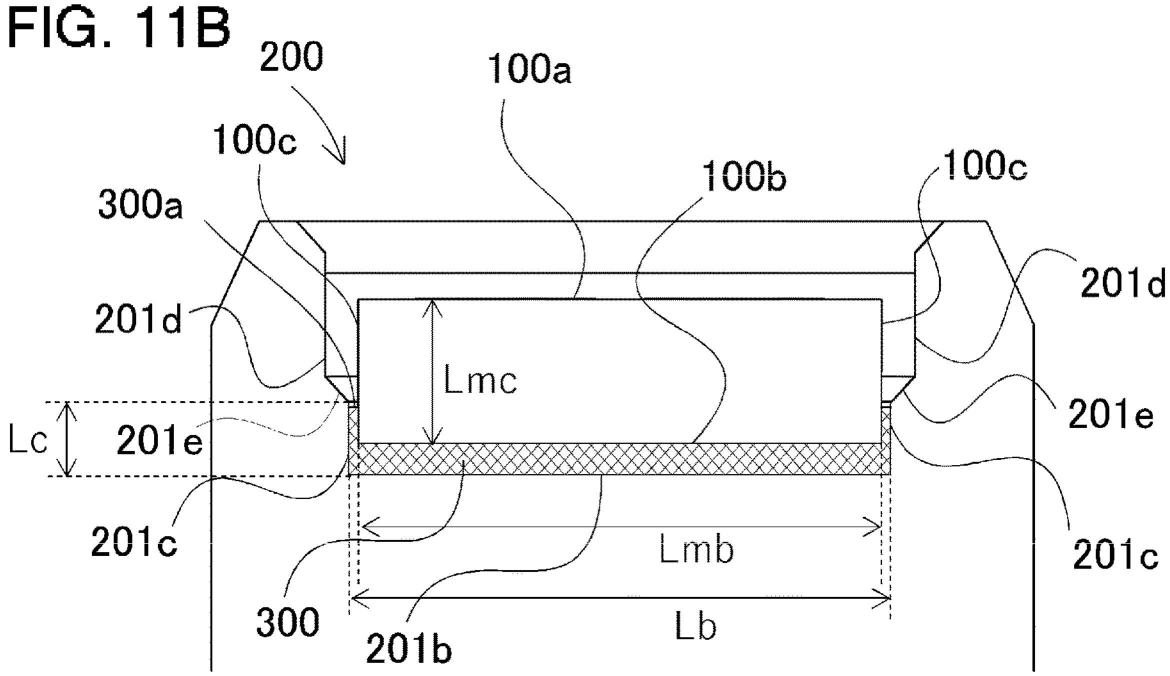

The detailed configurations of the memory tag 100 and the memory mounting portion 200 will be described. FIG. 1A is a plan view of the memory mounting portion 200 before the memory tag 100 is mounted. FIG. 1B is a cross-sectional view of the memory mounting portion 200 in a state in which the memory tag 100 is fixed by adhesive 300. FIG. 9 is a perspective view of the memory tag 100. FIG. 10 is a perspective view of the memory mounting portion 200 before the memory tag 100 is mounted. FIGS. 11A and 11B are cross-sectional views showing the process of applying the adhesive 300 to mount the memory tag 100 on the memory mounting portion 200.

Memory Tag

The memory tag 100 includes a storage element that stores information relating to the cartridge B. The information includes, for example, the lot number of the cartridge, the characteristic information of the cartridge, the characteristic information of the image forming apparatus to which the cartridge is installed, or the like. By referring to these information items, it is possible to facilitate the maintenance of the apparatus main body A or the cartridge B.

The memory tag 100 exemplified in FIG. 9 is a plate-shaped member that has a length of 5.5 mm and a width of 5 mm as the respective sides of an upper surface and has a thickness of 1.4 mm. The memory tag 100 includes a contact surface 100*a* (first surface), a bottom surface 100*b* (second surface) opposing the contact surface 100*a*, and four lateral surfaces 100*c* that extend in a direction crossing the contact surface 100*a* and the bottom surface 100*b*. Further, the memory tag 100 is constituted by the two layers of a memory substrate 102 on which a storage element not shown is mounted and a protection portion 103 that is integrated with the memory substrate 102 and covers and protects the storage element. On the contact surface 100*a* of the upper surface of the memory substrate 102, contact portions 101 electrically connected to the storage element are formed to be exposed. Note that the shape of the memory tag 100 is not limited to a substantially cuboid shape.

Memory Mounting Portion

A configuration for mounting the memory tag 100 on the cartridge B will be specifically described with reference to FIGS. 1A and 1B, FIG. 5, and FIG. 9 to FIGS. 11A and 11B.

The memory mounting portion 200 for accommodating and fixing the memory tag 100 is formed as a substantially quadrangular depressed portion in a plan view at the prescribed position of the non-driving-side developing bearing 47 serving as the exterior portion of the cartridge B (see FIGS. 1A and 1B, FIG. 5, and FIG. 10). The depressed portion of the memory mounting portion 200 is opened in a direction in which the cartridge is installed in the apparatus main body A. The depressed portion serves as an accommodation portion 201 that accommodates the memory tag 100. The accommodation portion 201 includes a bottom surface opposing portion 201*b* (first opposing portion) that opposes the bottom surface 100*b* when the memory tag 100 is accommodated. The accommodation portion 201 further includes lateral surface restriction portions 201*c* (second opposing portions), lateral surface buffer portions 201*d*, and inclination surfaces 201*e* (third opposing portions) that oppose the lateral surfaces 100*c* when the memory tag 100 is accommodated.

Note that in the following description, a direction perpendicular to the surface of the bottom surface opposing portion 201*b* will be defined as a height direction and a distance from the surface of the bottom surface opposing portion 201*b* in the height direction will be defined as a height for the sake of convenience.

As shown in FIGS. 11A and 11B, the lateral surface buffer portions 201*d* are positioned at places more distant from the lateral surfaces 100*c* than the lateral surface restriction portions 201*c*. Further, the inclination surfaces 201*e* are provided so as to connect the lateral surface restriction portions 201*c* and the lateral surface buffer portions 201*d* to each other. Further, a height Lc of the lateral surface restriction portions 201*c* in the thickness direction of the memory tag 100 falls within a range not greater than a thickness Lmc of the lateral surfaces 100*c* of the memory tag 100 (Lc<Lmc). In the present embodiment, it is assumed that Lmc=1.4 mm and Lc=0.8 mm.

In the accommodation portion 201, the positions of the respective lateral surfaces 100*c* of the memory tag 100 are restricted by the lateral surface restriction portions 201*c* opposing the respective lateral surfaces 100*c*. Here, in order to cause the main-body electrode portions 33 of the apparatus main body A to reliably contact the contact portions 101 of the memory tag 100, the movement of the memory tag 100 inside the accommodation portion 201 is needed to be suppressed to a greater extent. In the present embodiment, a width Lb between the opposing lateral surface restriction portions 201*c* is therefore set to be slightly greater than a width Lmb of the memory tag 100 (Lb<Lmb). Thus, both the smooth accommodation of the memory tag 100 in the accommodation portion 201 and the prevention of the free movement of the memory tag 100 inside the accommodation portion 201 are achieved.

Mounting and Fixation of Memory Tag on Memory Mounting Portion

The memory tag 100 is fixed onto the memory mounting portion 200 via the adhesive 300. In a fixed state, the adhesive 300 exists between the bottom surface 100*b* and the bottom surface opposing portion 201*b* and between the lateral surfaces 100*c* and the lateral surface restriction portions 201*c*. As the adhesive 300, one having adequate bonding strength for the respective materials of the memory tag 100 and the memory mounting portion 200 is preferably used. For example, when an epoxy resin or a glass epoxy resin is used as the memory tag 100 and a PPE resin (polyphenylene ether), a PE resin (polyethylene), a PS resin (polystyrene), or a PP resin (polypropylene) is used as the memory mounting portion 200, a cyanoacrylate adhesive may be used. However, the types of the materials of the memory tag 100, the memory mounting portion 200, and the adhesive 300 are not limited to the above materials.

In the mounting of the memory tag 100, the adhesive 300 is first applied onto the accommodation portion 201 as shown in FIG. 11A. Next, the memory tag 100 is inserted into the accommodation portion 201 as shown in FIG. 11B. By the insertion of the memory tag 100 into the accommodation portion 201, the adhesive 300 is pressed and expanded by the memory tag 100 and spread between the bottom surface 100*b* of the memory tag and the bottom surface opposing portion 201*b*. The pressed and expanded adhesive 300 is further spread at least between the lateral surfaces 100*c* and the lateral surface restriction portions 201*c*.

FIG. 1B shows a state in which the insertion of the memory tag 100 is completed. In an example shown in FIG. 1B, a plurality of surfaces (here, the bottom surface 100*b* and at least the range of the lateral surfaces 100*c* opposing the lateral surface restriction portions 201*c*) of the memory tag 100 are bonded. Thus, compared with a case in which only the bottom surface 100*b* is bonded, it is possible to more firmly fix the memory tag 100 onto the memory mounting portion 200.

Further, when the adhesive 300 is applied by such an amount that the height of the upper surface 300*a* of the adhesive 300 becomes lower than that of the contact surface 100*a*, the adhesive 300 is prevented from adhering to the contact surface 100*a*. Accordingly, it is possible to secure the electrical connection between the main-body electrode portions 33 of the tag connector 32 and the contact portions 101 of the memory tag 100.

In the present embodiment, the lateral surface buffer portions 201*d* and the inclination surfaces 201*e* are provided at regions closer to the contact surface 100*a* than the lateral surface restriction portions 201*c* as shown in FIG. 1B. These portions are positioned at places more distant from the memory tag 100 than the lateral surface restriction portions 201*c*. Accordingly, compared with a case in which the lateral surface buffer portions 201*d* and the inclination surfaces 201*e* are not provided (that is, a case in which the lateral surfaces 100*c* and opposing surfaces are parallel to each other), it is possible to increase the volume of the space between the memory tag 100 and the accommodation portion 201 in which the adhesive 300 is accommodatable.

Here, as shown in FIG. 1B, the height of a portion at which the inclination surfaces 201*e* and the lateral surface buffer portions 201*d* are connected to each other is set to be lower than that of the contact surface 100*a*, whereby it is possible to accelerate timing at which the buffer region between the lateral surface buffer portions 201*d* and the lateral surfaces 100*c* produces a buffer effect.

Here, in manufacturing a multiplicity of cartridges B, the upper surface 300*a* of the adhesive 300 in the respective cartridges B preferably has a prescribed height. However, in a manufacturing step, there is a likelihood that the height of the upper surface 300*a* fluctuates since the application amount of the adhesive 300 slightly fluctuates. Therefore, by providing the lateral surface buffer portions 201*d* and the inclination surfaces 201*e* in the accommodation portion 201 as in the present embodiment, it is possible to reduce a fluctuation in the height of the upper surface 300*a* even if the application amount of the adhesive 300 fluctuates.

In addition, according to the present embodiment, the memory tag 100 is put in the lateral surface restriction portions 201*c* along the inclination surfaces 201*e* even if the memory tag 100 contacts the accommodation portion 201 when the memory tag 100 is inserted into the accommodation portion 201. Thus, since the bottom surface 100*b* adheres closely to the bottom surface opposing portion 201*b*, it is possible to reliably mount the memory tag 100 on the memory mounting portion 200.

As described above, according to the present embodiment, it is possible to firmly fix the memory tag 100 onto the memory mounting portion 200 by the adhesive 300 and prevent the memory tag from falling off the memory mounting portion. In addition, it is possible to reduce a fluctuation in the height of the upper surface 300*a* of the adhesive 300. In addition, it is possible to smoothly mount the memory tag 100 on the memory mounting portion 200.

Modified Examples

Figure 12A:
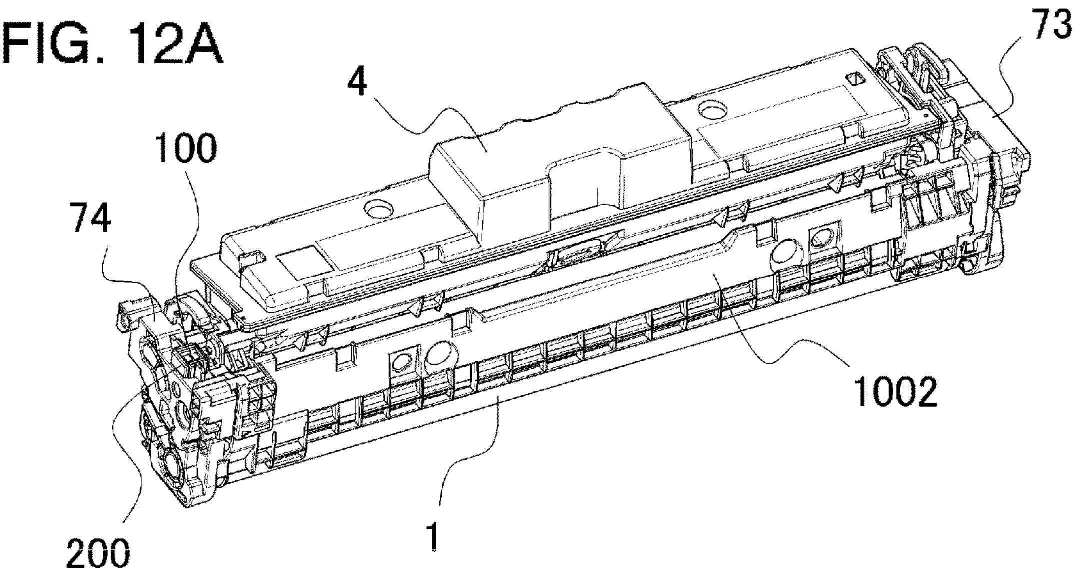
FIGS. 12A and 12B are perspective views showing the position of a memory mounting portion in a cartridge according to a modified example.
Figure 12B:
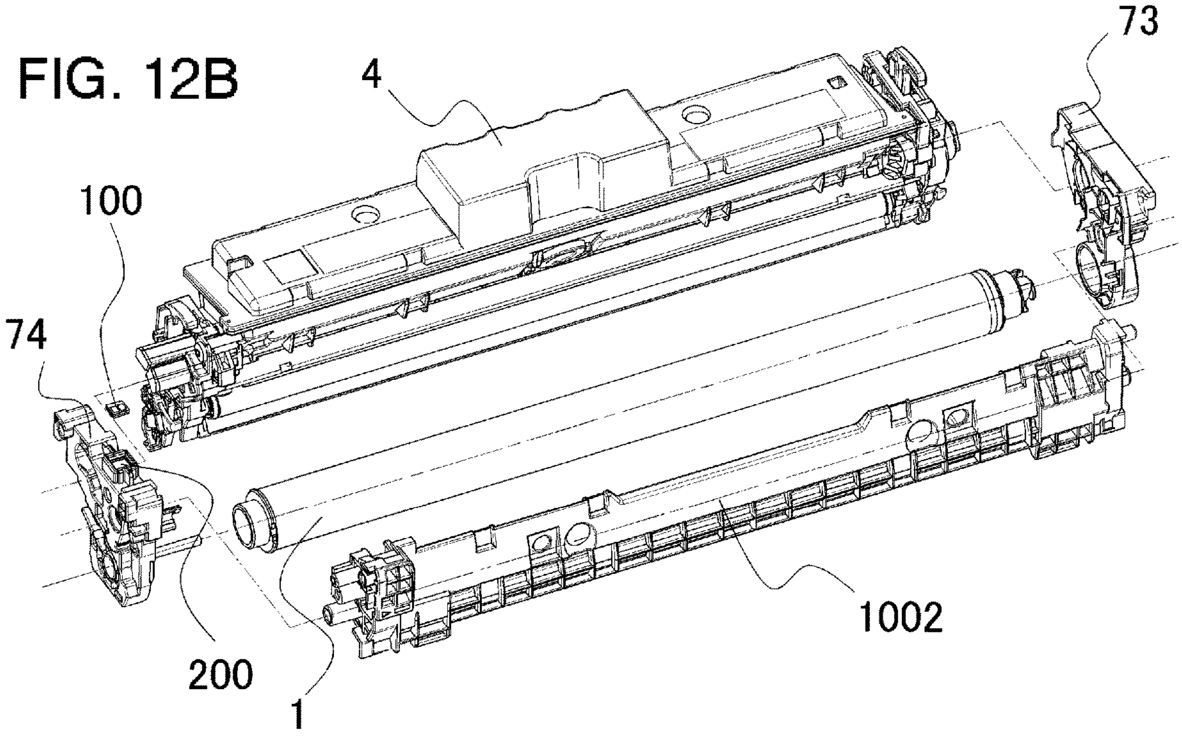

In the above description, the non-driving-side developing bearing 47 of the developing unit 4 is given as an example as a supporting body on which the memory mounting portion 200 is provided. However, the present invention is not limited to this example. As another example to which the present invention is applicable, FIGS. 12A and 12B show a cartridge B including a photosensitive drum 1, a charging unit 1002 serving as a charging apparatus, and a developing unit 4 serving as a developing apparatus. The cartridge B rotatably supports the photosensitive drum 1 and the developing unit 4 with a driving-side drum bearing 73 and a non-driving-side drum bearing 74. A memory mounting portion 200 is provided at the non-driving-side drum bearing 74 in the example shown in FIGS. 12A and 12B but may be provided at the driving-side drum bearing 73, the charging unit 1002, or the developing unit 4.

In addition, the memory tag mounting configuration of the present embodiment is also applicable to a cartridge other than a process cartridge. Examples of other cartridges include a drum cartridge having a photosensitive drum and a developing cartridge including a developer bearing member for supplying developer to an image bearing member on which a toner image is formed and a developer accommodation portion accommodating the developer. In addition, examples of other cartridges include a developer cartridge accommodating developer and an inkjet cartridge accommodating ink used in an inkjet recording apparatus. Besides, the present invention is applicable in a case in which a memory tag is mounted on a cartridge detachably attachable to the apparatus main body of an image forming apparatus.

Second Embodiment

Subsequently, a second embodiment will be described. Since the present embodiment is roughly characterized in the configuration of a memory mounting portion and the mounting and fixing method of a memory tag, the portions will be mainly described. The descriptions of the same configurations as those of the first embodiment will be simplified.

Lenticulation and Scattering of Adhesive

Figure 13A:
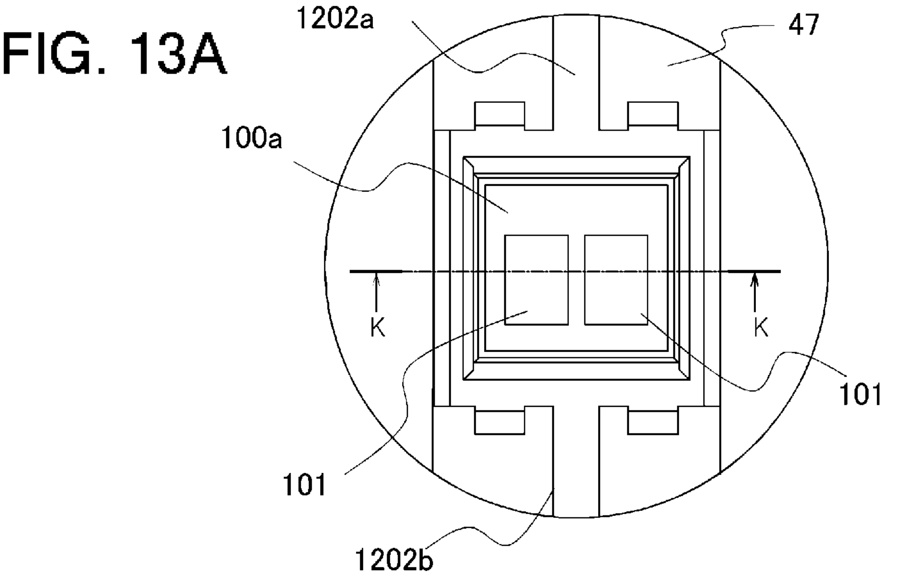
FIGS. 13A to 13C are views describing the state of adhesive after the mounting of a conventional memory tag.
Figure 13B:
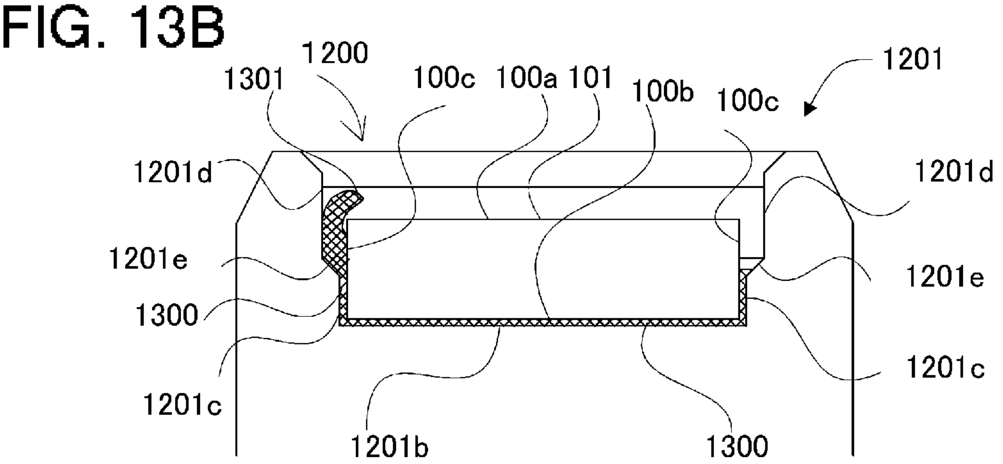
Figure 13C:
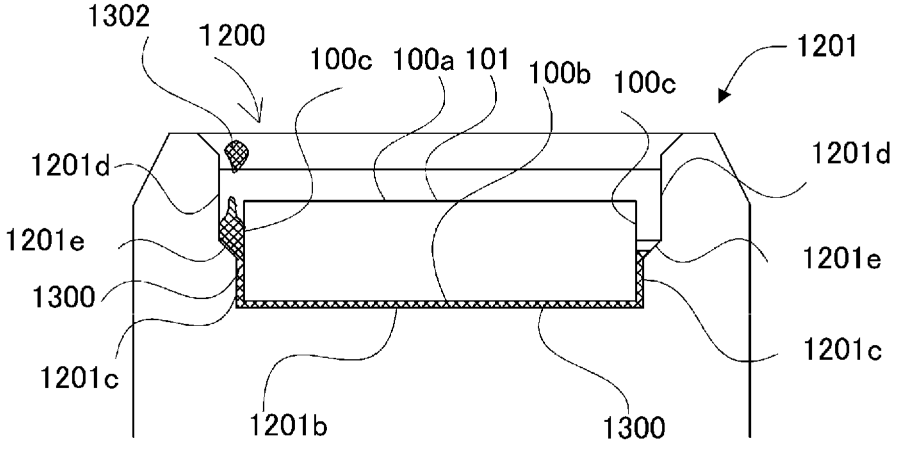

Here, the lenticulation, scattering, or the like of adhesive 1300 that could occur when a memory tag 100 is mounted on an accommodation portion 1201 as shown in the first embodiment by adhesive 1300 having low viscosity as a material characteristic will be described. FIGS. 13A to 13C show the behavior of the adhesive 1300 when the memory tag 100 is inserted into the accommodation portion 1201 to which the adhesive 1300 is applied. FIG. 13A shows a state immediately after the memory tag 100 is mounted. FIG. 13B is a cross-sectional view taken along the line K-K in FIG. 13A and shows a state in which the adhesive 1300 is lenticulated as a result of the mounting of the memory tag 100. FIG. 13C is also a cross-sectional view taken along the line K-K in FIG. 13A and shows a state in which the adhesive is scattered as a result of the mounting of the memory tag.

When the memory tag 100 is inserted into the accommodation portion 1201 to which the adhesive 1300 is applied, the adhesive 1300 is pressed and expanded to the memory tag 100. Here, when the adhesive 1300 has low viscosity (for example, about 2 mpa·s), lenticulation 1301 is likely to occur in the pressed and expanded adhesive 1300 as shown in FIG. 13B. The lenticulated adhesive 1300 sometimes rebounds after hitting a lateral surface buffer portion 1201*d*, runs on a contact surface 100*a* of the memory tag 100, and adheres to contact portions 101.

In addition, when a speed at which the memory tag 100 is mounted is fast, the adhesive extruded by the memory tag 100 sometimes flies out as a droplet 1302 as shown in FIG. 13C. As a result, there is a possibility that the adhesive 1300 adheres to the contact portions 101 of the contact surface 100*a* or scatters to the outside of an accommodation portion.

Accordingly, when the adhesive 1300 having low viscosity is used under the configuration of the first embodiment, there is a need to accurately manage the application amount of the adhesive 1300 and prevent the lenticulated adhesive 1300 from running on the contact surface 100*a*. Further, there is a need to decrease the mounting speed of the memory tag 100 to reduce the scattering of the adhesive 1300.

Memory Mounting Portion

Figure 14A:
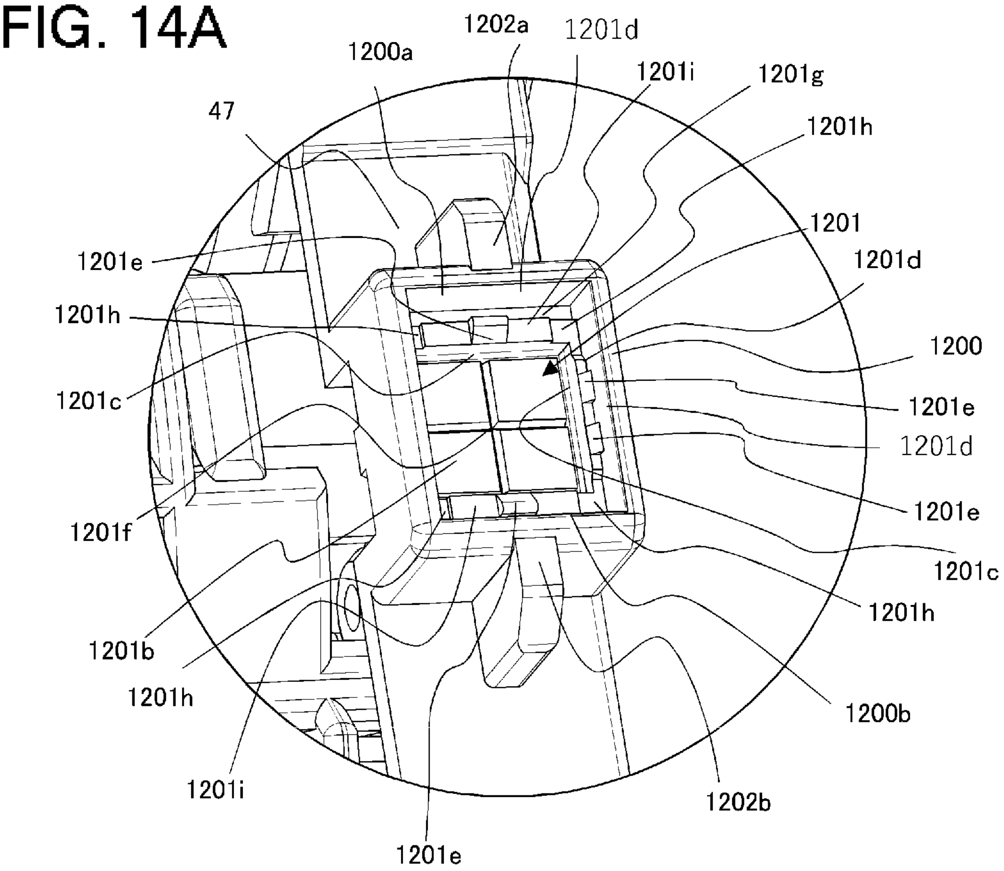
FIGS. 14A and 14B are views showing the vicinity of a memory mounting portion according to a second embodiment.
Figure 14B:
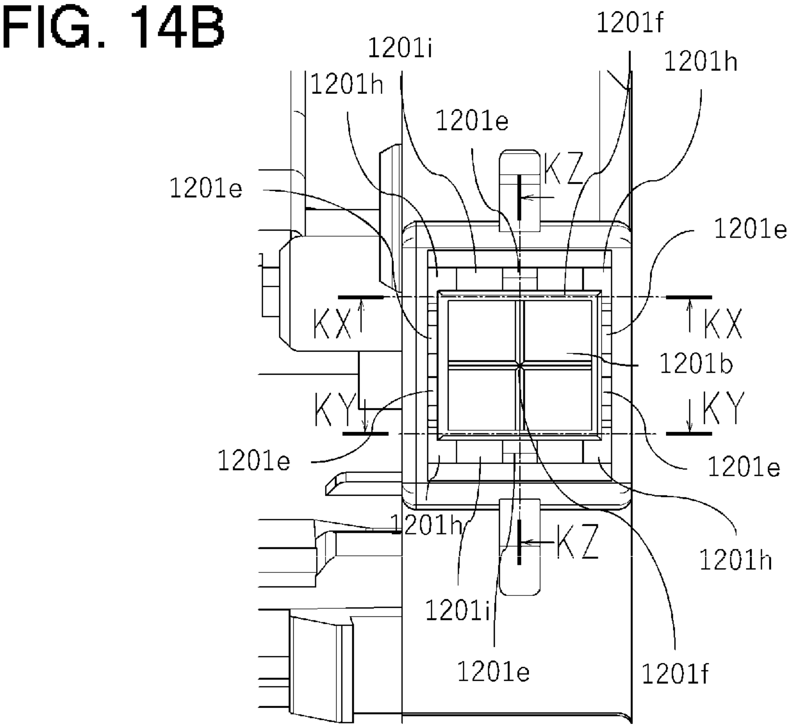
Figure 15A:
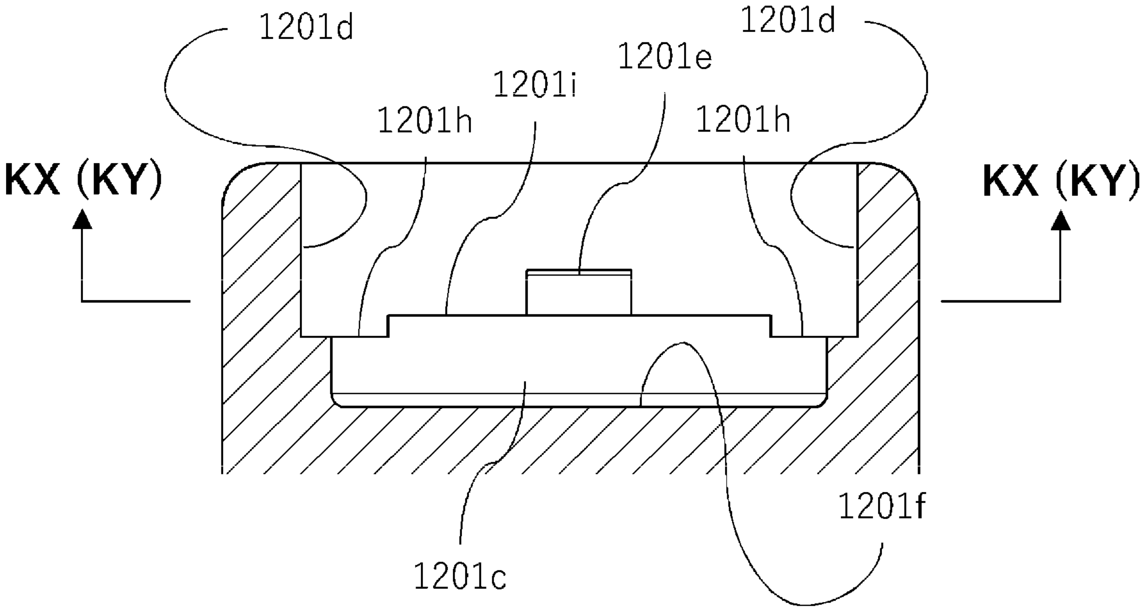
FIGS. 15A and 15B are cross-sectional views of the vicinity of the memory mounting portion according to the second embodiment.
Figure 15B:
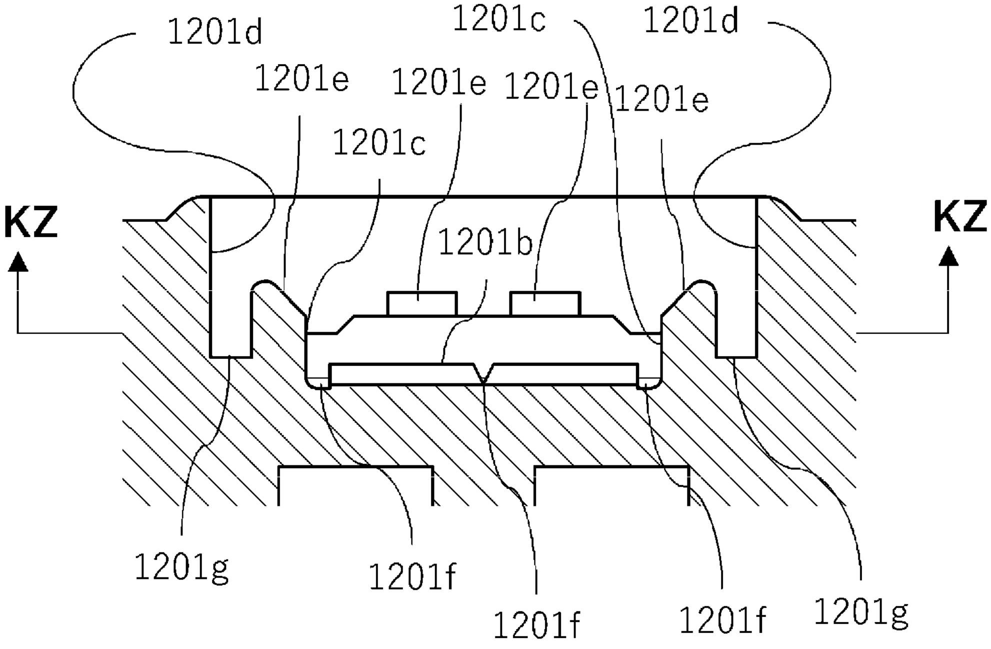

In view of this problem, the present embodiment provides a configuration for stably mounting the memory tag 100 on a cartridge B even when the adhesive 1300 having low viscosity is used. FIG. 14A is a perspective view of the vicinity of a memory mounting portion. FIG. 14B is a view of the vicinity of the memory mounting portion when seen from the front side of a bottom surface opposing portion. FIG. 15A is a cross-sectional view of the vicinity of the memory mounting portion when seen from the KX-KX cross-section and the KY-KY cross section of FIG. 14B. FIG. 15B is a cross-sectional view of the vicinity of the memory mounting portion when seen from the KZ-KZ cross section of FIG. 14B.

Like the first embodiment, the memory tag 100 is accommodated in a memory mounting portion 1200 and fixed by the adhesive 1300 to be mounted on the cartridge B. Further, the memory mounting portion 1200 of the present embodiment is also provided at a non-driving-side developing bearing 47 serving as the exterior portion of the cartridge B as a substantially quadrangular depressed portion having its one end opened. The depressed portion is constituted as the accommodation portion 1201. The accommodation portion 1201 includes a bottom surface opposing portion 1201*b* (first opposing portion) opposing a bottom surface 100*b* of the memory tag 100 and lateral surface restriction portions 1201*c* (second opposing portions) opposing lateral surfaces 100*c*.

In addition, as shown in FIGS. 14A and 14B and FIGS. 15A and 15B, the bottom surface opposing portion 1201*b* of the present embodiment is provided with a flow path groove 1201*f*. The flow path groove 1201*f* includes a quadrangular-shaped portion and a cross-shaped portion. The quadrangular-shaped portion is a portion that corresponds to the connected portion between the bottom surface opposing portion 1201*b* and the lateral surface restriction portions 1201*c* and is obtained by connecting the four outsides of the bottom surface opposing portion 1201*b* to each other. The cross-shaped portion is provided at the center of the bottom surface opposing portion 1201*b*. In order to smoothly spread the adhesive 1300, the cross-shaped groove and the quadrangular-shaped groove are preferably connected to each other. By the existence of the flow path groove 1201*f*, the adhesive 1300 evenly sneaks to the entire surface of the bottom surface opposing portion 1201*b* when the adhesive 1300 is applied.

Note that the shape of the flow path groove 1201*f* is not limited to the example shown in FIGS. 14A and 14B and FIGS. 15A and 15B but may only be a shape enabling the diffusion of the adhesive 1300. The arrangement or shape of the flow path groove 1201*f* is appropriately designed according to the type of the adhesive 1300, the application condition of the adhesive 1300, the materials or sizes of both members bonded to each other, required bonding strength, or the like.

For example, the shape of the flow path groove 1201*f* is not limited to a cross shape including crosswise grooves at the central portion of the bottom surface opposing portion 1201*b*. Alternatively, the number of grooves in a lengthwise direction and/or a widthwise direction may be increased, or grooves in an oblique direction may be added. Further, for example, the flow path groove 1201*f* may be provided only at the central portion of the bottom surface opposing portion 1201*b*. In this case, the shape is not limited to a cross shape. As opposed to this, only the flow path groove 1201*f* surrounding the bottom surface opposing portion 1201*b* may be provided.

In the present embodiment, lateral surface buffer portions 1201*d*, accumulation groove portions 1201*g*, slant portions 1201*e*, and overflow step portions 1201*h* are further provided at positions more distant from the bottom surface opposing portion 1201*b* than the lateral surface restriction portions 1201*c*.

The height of the lateral surface restriction portions 1201*c* in its direction perpendicular to a surface forming the bottom surface opposing portion 1201*b* is set to fall within a range not greater than the thickness of the memory tag. By setting such a height, it is possible to prevent the adhesive 1300 from rebounding after hitting the lateral surface restriction portions 1201*c* when the memory tag 100 is inserted. In the present embodiment, the lateral surface restriction portions 1201*c* are set to have a height of 0.8 mm (see FIG. 17B) relative to the thickness of the memory tag, 1.4 mm.

The accumulation groove portions 1201*g* are groove-shaped portions formed at positions lower than the apexes of the lateral surface restriction portions 1201*c* in their direction perpendicular to the surface forming the bottom surface opposing portion 1201*b*. In the present embodiment, the accumulation groove portions 1201*g* are provided at two right and left spots that are parts of the four sides of the bottom surface opposing portion 1201*b* as shown in FIG. 15B. However, the accumulation groove portions 1201*g* may be provided at three spots so as to correspond to three sides of the bottom surface opposing portion 1201*b*, or may be arranged at four spots so as to surround the bottom surface opposing portion 1201*b* in all directions.

The lateral surface buffer portions 1201*d* are provided at positions more distant from the bottom surface opposing portion 1201*b* than the lateral surface restriction portions 1201*c* so as to surround the lateral surface restriction portions 1201*c* in all directions. About the spots at which the accumulation groove portions 1201*g* are provided, the lateral surface buffer portions 1201*d* are provided at positions more distant from the bottom surface opposing portion 1201*b* than the accumulation groove portions 1201*g*. It can be said that the lateral surface buffer portions 1201*d* generally define the outermost periphery of the entire accommodation portion 1201.

The upper surfaces of the lateral surface restriction portions 1201*c* are called lateral-surface restriction upper surface portions 1201*i*. On the lateral-surface restriction upper surface portions 1201*i*, the slant portions 1201*e* and the overflow step portions 1201*h* are provided. The overflow step portions 1201*h* are provided so as to connect the lateral surface restriction portions 1201*c* and the accumulation groove portions 1201*g* to each other. The height of the overflow step portions 1201*h* is lower than that of the lateral-surface restriction upper surface portions 1201*i* and higher than those of the accumulation groove portions 1201*g* and the bottom surface opposing portion 1201*b* in a direction perpendicular to the surface of the bottom surface opposing portion 1201*b*.

The slant portions 1201*e* have a slant shape that is lower on its side close to the lateral surface restriction portions 1201*c* and higher on its side close to the accumulation groove portions 1201*g* in the direction perpendicular to the surface of the bottom surface opposing portion 1201*b* of the lateral surface restriction portions 1201*c*. The slant portions 1201*e* play a role in luring the memory tag 100 when the memory tag 100 is mounted.

Mounting and Fixation of Memory Tag on Memory Mounting Portion

Figure 16A:
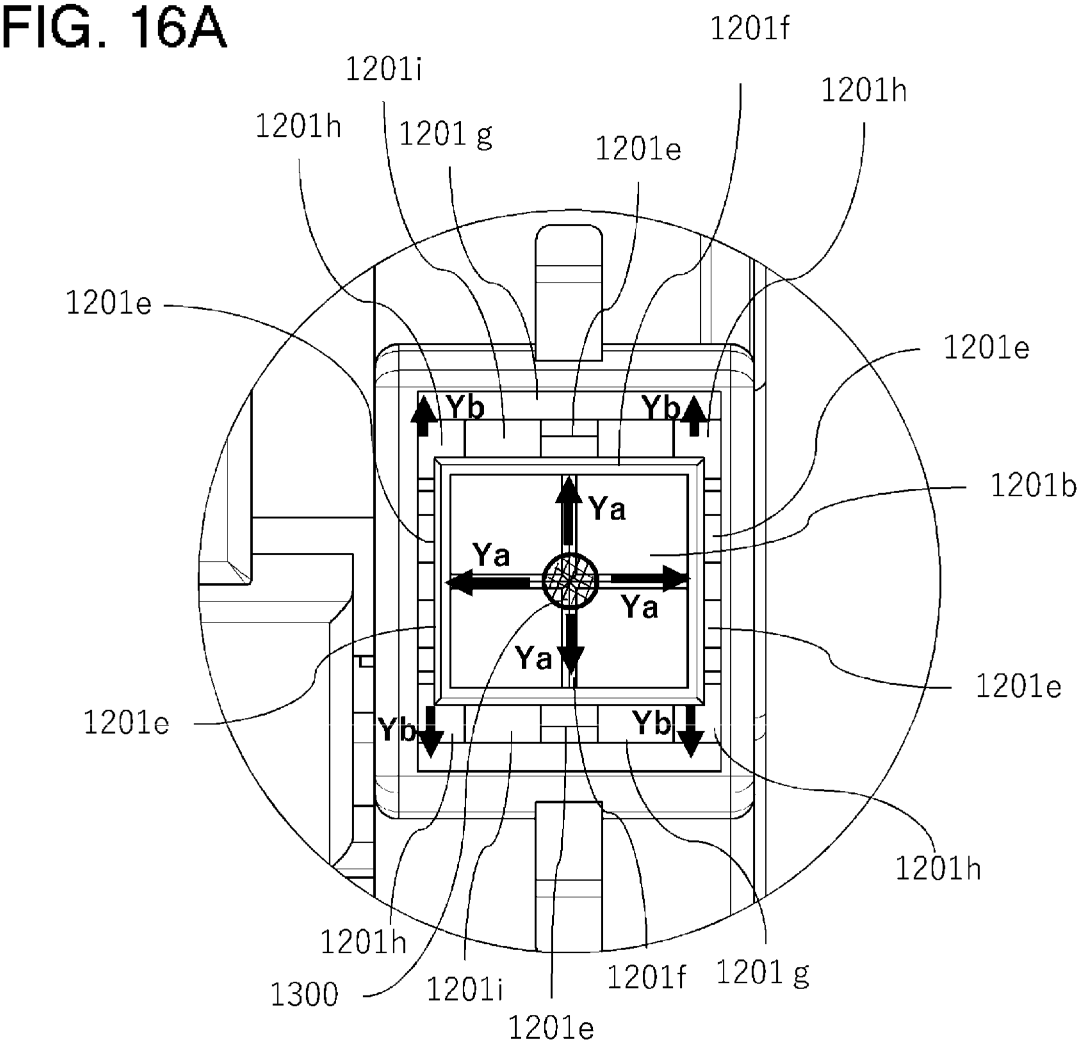
FIGS. 16A and 16B are views describing the state of mounting a memory tag according to the second embodiment.
Figure 16B:
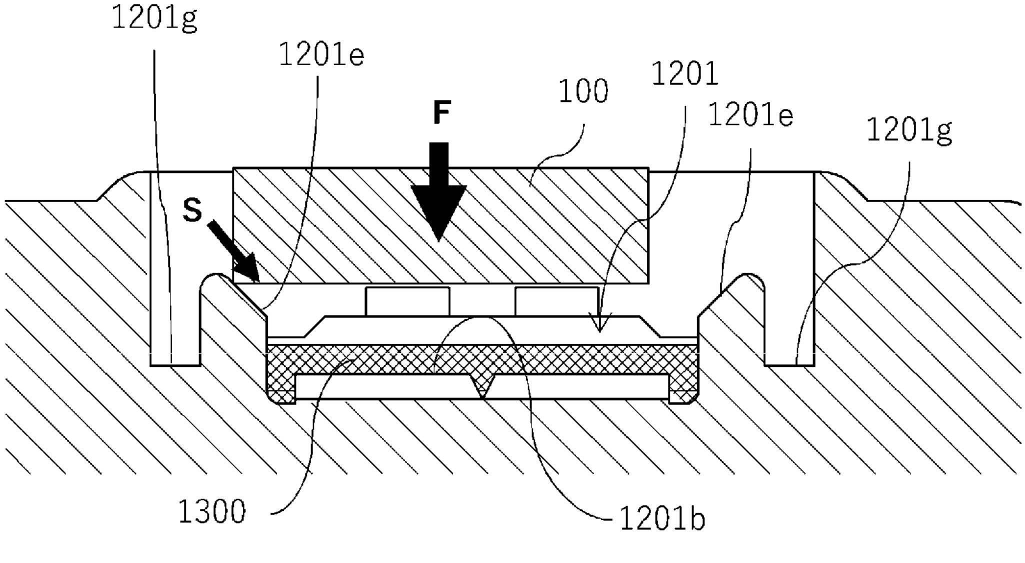

FIG. 16A shows a state in which the adhesive 1300 circulates around the entire region of the memory mounting portion 1200 during the application of the adhesive 1300. FIG. 16B is a cross-sectional view showing a state in which the memory tag 100 is inserted into the accommodation portion 1201 while being lured into the slant portions 1201*e*.

Figure 17A:
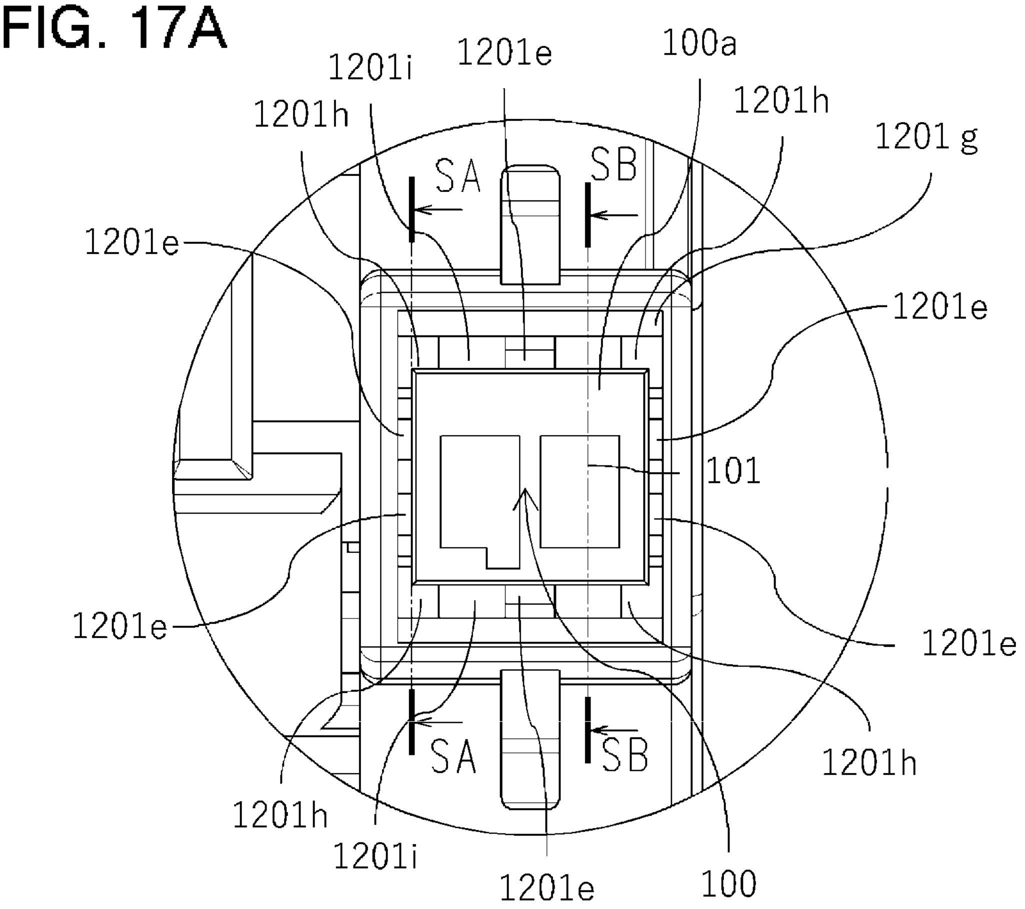
FIGS. 17A and 17B are views describing the insertion of the memory tag according to the second embodiment.
Figure 17B:
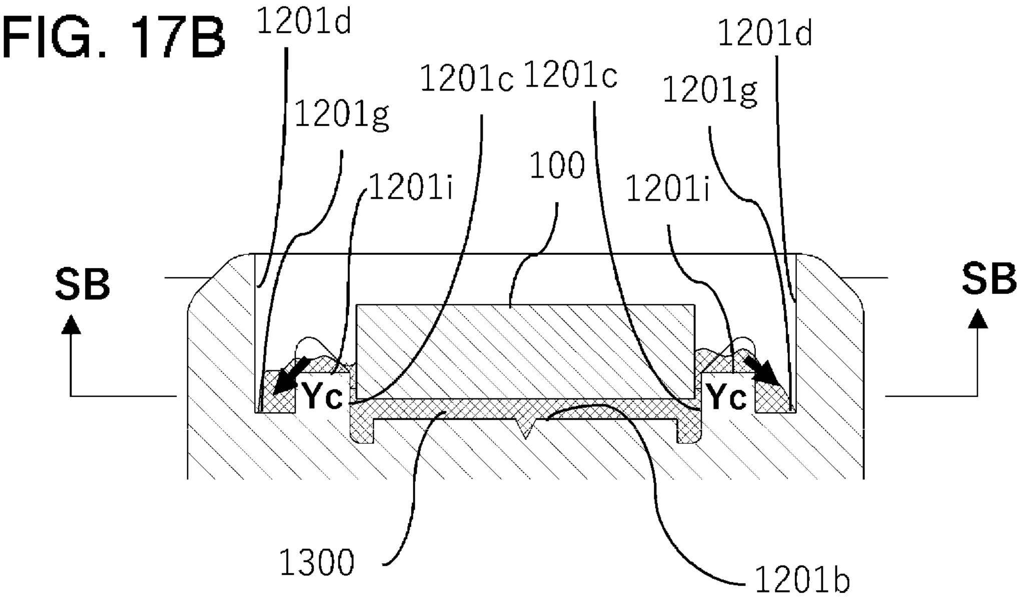

FIG. 17A shows the process of inserting the memory tag 100 into the accommodation portion 1201. FIG. 17B is a cross-sectional view of the accommodation portion 1201 when seen from the SB-SB cross section of FIG. 17A and shows the flow of the adhesive 1300 when the memory tag 100 is inserted into the accommodation portion 1201.

Figure 18A:
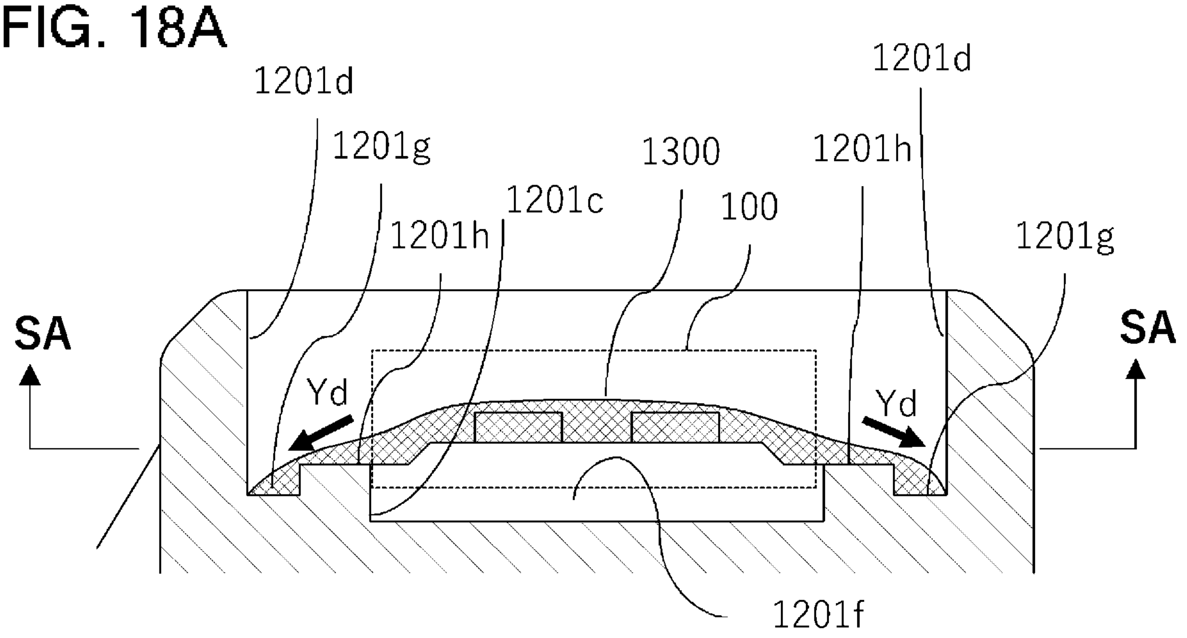
FIGS. 18A and 18B are cross-sectional views describing the mounting of the memory tag on an accommodation portion according to the second embodiment.
Figure 18B:
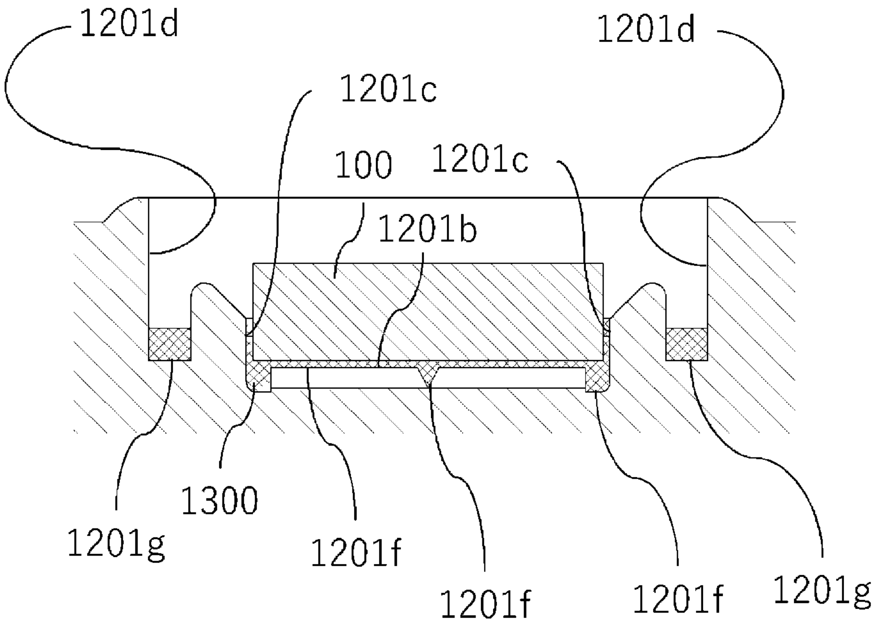

FIG. 18A is a cross-sectional view of the accommodation portion 1201 when seen from the SA-SA cross section of FIG. 17A and shows the flow of the adhesive 1300 when the memory tag 100 is inserted into the accommodation portion 1201. FIG. 18B is a cross-sectional view showing a state in which the mounting of the memory tag 100 is completed.

First, as shown in FIG. 16A, the adhesive 1300 is applied onto the accommodation portion 1201 of the memory mounting portion 1200. In an example shown in FIG. 16A, the adhesive 1300 is applied in the vicinity of the center of the bottom surface opposing portion 1201*b*. In the present embodiment, a cyanoacrylate adhesive (having a viscosity of about 2 mpa·s) having adequate bonding strength for the respective materials of the memory tag 100 and the memory mounting portion 1200 is used as the adhesive 1300.

The applied adhesive 1300 circulates around the surface of the bottom surface opposing portion 1201*b* along the flow path grooves 1201*f* provided in a cross shape at the center of the bottom surface opposing portion 1201*b* (as indicated by arrows Ya in FIG. 16A) and then moves along the flow path grooves 1201*f* on the four outer sides of the bottom surface opposing portion 1201*b*. Thus, the adhesive 1300 evenly circulates around the entire region of the bottom surface opposing portion 1201*b*. Accordingly, since it is possible to reduce unevenness in the wraparound of the adhesive 1300 when the memory tag 100 is mounted later, the bonding and fixation of the memory tag 100 is secured. In addition, it is also possible to prevent the overflow of the adhesive 1300 due to the unevenness of the adhesive 1300.

In addition, the configuration of the present embodiment is also applicable to a case in which the application amount of the adhesive 1300 fluctuates within the surface of the adhesive 1300 and the adhesive 1300 partially overflows. That is, the overflowing adhesive 1300 flows into the accumulation groove portions 1201*g* along the overflow step portions 1201*h* lower in height than the lateral-surface restriction upper surface portions 1201*i* (as indicated by arrows Yb in FIG. 16A).

Next, as shown in FIG. 16B, the memory tag 100 is inserted into the accommodation portion 1201 (as indicated by an arrow F). Even if the center of the memory tag 100 is slightly deviated from the center of the bottom surface opposing portion 1201*b* at this time, the memory tag 100 moves while sliding in the direction of an arrow S under the existence of the slant portions 1201*e* and is inserted into the accommodation portion 1201. That is, it is possible to absorb a positioning fluctuation during the mounting of the memory tag 100 on the accommodation portion 1201.

Then, as shown in FIGS. 17A and 17B, the adhesive 1300 is pressed and expanded by the memory tag 100 when the insertion of the memory tag 100 into the accommodation portion 1201 is completed. At this time, the adhesive 1300 spreads between the bottom surface 100*b* and the bottom surface opposing portion 1201*a* and between the lateral surface 100*c* and at least the lateral surface restriction portions 1201*c*. Thus, the adhesive 1300 is arranged at a portion needed to fix the memory tag 100.

In addition, the surplus adhesive 1300 that overflows after being pressed and expanded by the memory tag 100 gets over the lateral-surface restriction upper surface portions 1201*i* and flows out in the direction of the lateral surface buffer portions 1201*d*. At this time, since the overflowing surplus adhesive 1300 runs down the accumulation groove portions 1201*g* before hitting the lateral walls of the lateral surface buffer portions 1201*d* with the provision of the accumulation groove portions 1201*g* (as indicated by arrows Yc in FIG. 17B), it is possible to prevent the lenticulation of the adhesive 1300.

Further, as shown in FIG. 18A, the overflow step portions 1201*h* lower in height than the lateral-surface restriction upper surface portions 1201*i* are provided at both ends of sides on which the accumulation groove portions 1201*g* are not provided. Therefore, the overflowing adhesive 1300 flows into the accumulation groove portions 1201*g* along the overflow step portions 1201*h* (as indicated by arrows Yd in FIG. 18A). When the insertion of the memory tag 100 is completed, as shown in FIG. 18B, a plurality of surfaces (the bottom surface 100*b* and the range of the lateral surfaces 100*c* that oppose at least the lateral surface restriction portions 1201*c*) of the memory tag 100 are bonded.

Like the first embodiment, the positions of the respective lateral surfaces 100*c* of the memory tag 100 are restricted by the opposing lateral surface restriction portions 1201*c* in the accommodation portion 1201. Therefore, in order to make main-body electrode portions 33 of an apparatus main body A reliably contact portions 101 of the memory tag 100 to enable information communication in the present embodiment as well, the width between the opposing lateral surface restriction portions 1201*c* may only be slightly greater than that of the memory tag 100.

The above configuration makes it possible to cause the surplus adhesive 1300 overflowing during the application of the adhesive 1300 or during the mounting of the memory tag 100 to positively flow into the accumulation groove portions 1201*g*. Therefore, it is possible to prevent the lenticulation of the adhesive 1300 or prevent the overflow of the adhesive 1300 to the contact surface 100*a* of the memory tag 100. As a result, it is possible to prevent the overflowing surplus adhesive 1300 from adhering to the contact portions 101 of the contact surface 100*a* of the memory tag 100 or prevent the same from scattering to the accommodation portion 1201 or the outside of the cartridge B. Accordingly, it is possible to stably secure the electrical connection between the main-body electrode portions 33 of the tag connector 32 and the contact portions 101 of the memory tag 100.

In addition, the above configuration makes it possible to prevent the lenticulation of the adhesive 1300 or prevent the adhesive 1300 from scattering to the contact portions 101 of the contact surface 100*a* of the memory tag 100 during the mounting of the memory tag 100. Therefore, it is possible to further prevent a fluctuation in the application of the adhesive 1300 during the mounting and stably mount the memory tag 100. Further, since scattering is not likely to occur even if the mounting speed of the memory tag 100 is increased, productivity is improved.

Note that the installation place of the memory mounting portion 1200 is provided at the non-driving-side developing bearing 47 of the developing unit 4 but is not limited to this. The configuration of the present embodiment is also applicable to a cartridge B that is the same as the one described using FIGS. 12A and 12B in the modified examples of the first embodiment. In addition, the present embodiment is the same as the first embodiment in that the configuration of the memory mounting portion 1200 is also applicable to a cartridge other than a process cartridge or an image forming apparatus other than an electrophotographic image forming apparatus.

As described above, it is possible to firmly fix a memory tag to a memory mounting portion by adhesive and prevent the memory tag from falling off the memory mounting portion according to the respective embodiments of the present invention. Note that it is possible to arbitrarily combine together the constituting elements relating to the shape of the memory mounting portion described in the respective embodiments of the present invention so long as any contradiction does not arise between the constituting elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-144891, filed Aug. 28, 2020, which is hereby incorporated by reference wherein in its entirety.

What is claimed is:

1. A cartridge comprising:

a memory member configured to store information, the memory member including (i) a first surface including an electrical contact, (ii) a second surface on a side opposite to the first surface, and (iii) a lateral surface extending in a direction crossing the first surface and the second surface; and a supporting body including a memory mounting portion, the memory mounting portion including (i) a first opposing surface opposing the second surface and (ii) a wall extending in a direction crossing the first opposing surface, wherein the memory member is mounted on the memory mounting portion with adhesive between the second surface and the first opposing surface and the adhesive contacts the lateral surface, and wherein the wall includes (i) a first portion, (ii) a second portion connected to the first portion, (iii) a third portion connected to the second portion and opposing the first portion, and (iv) a fourth portion connected to the first portion and the third portion and opposing the second portion, wherein:

an entirety of the first portion, the second portion, the third portion, and the fourth portion are higher than the first surface of the memory member in a height direction, which is a direction perpendicular to the first opposing surface, wherein as viewed in the height direction, the memory member is disposed between the first portion and the third portion, and is disposed between the second portion and the fourth portion, wherein the memory mounting portion includes a second opposing portion extending in a direction crossing the first opposing surface, the second opposing portion being configured to position the memory member, wherein the memory member is mounted on the memory mounting portion with the adhesive between the lateral surface and the second opposing portion, the adhesive contacting the lateral surface and the second opposing portion, and wherein in the height direction, a distance between a top end of the second opposing portion and a top end of the wall is greater than a distance between the top end of the second opposing portion and the first opposing surface.

2. The cartridge according to claim 1, wherein the wall includes:

the second opposing portion, and a part that is;

connected to the second opposing portion, more distant from the lateral surface than the second opposing portion, and positioned at a higher place than the second opposing portion in the height direction.

3. The cartridge according to claim 2, wherein the second opposing portion and the part of the wall are connected to each other by an inclination surface inclined with respect to the height direction.

4. The cartridge according to claim 3, wherein a height of a portion at which the inclination surface and the part of the wall are connected to each other is less than a height of the first surface in the height direction.

5. The cartridge according to claim 1, wherein:

the memory mounting portion includes a groove portion, and as viewed in the height direction, the second opposing portion is closer to the lateral surface than the groove portion is to the lateral surface.

6. The cartridge according to claim 5, wherein as viewed in the height direction, the groove portion surrounds the wall.

7. The cartridge according to claim 5, wherein the groove portion configured to accommodate the adhesive overflowing from the first opposing surface.

8. The cartridge according to claim 1, wherein:

the wall includes a slant portion including a lower end and a higher end in the height direction, and as viewed in the height direction, the lower end is closer to the memory member than the higher end is to the memory member.

9. The cartridge according to claim 1, wherein the first opposing surface is provided with a flow path groove accommodating the adhesive.

10. The cartridge according to claim 9, wherein the flow path groove includes a first extending portion and a second extending portion crossing the first extending portion.

11. The cartridge according to claim 9, wherein the flow path groove includes a portion that surrounds outside of the first opposing surface.

12. An image forming apparatus comprising:

a main body of the image forming apparatus; and the cartridge according to claim 1, the cartridge being detachably attachable to the main body of the image forming apparatus, wherein the main body of the image forming apparatus includes a main-body electrode portion configured to be connected to the electrical contact.

13. The cartridge according to claim 1, wherein:

as viewed in the height direction, the memory member is disposed between:

the first portion and the third portion in a first direction; and the second portion and the fourth portion in a second direction perpendicular to the first direction, and as viewed in the height direction, (i) a length of the first portion and a length of the third portion are longer than a length of the memory member with respect to the second direction, and (ii) a length of the second portion and a length of the fourth portion are longer than a length of the memory member with respect to the first direction.

* * * * *